US011775411B2

(12) United States Patent
Yang et al.

(10) Patent No.: US 11,775,411 B2
(45) Date of Patent: *Oct. 3, 2023

(54) DETECTION OF COMPUTING RESOURCE LEAKAGE IN CLOUD COMPUTING ARCHITECTURES

(71) Applicant: MICROSOFT TECHNOLOGY LICENSING, LLC, Redmond, WA (US)

(72) Inventors: Xinsheng Yang, Redmond, WA (US); Yingnong Dang, Redmond, WA (US); Justin Ding, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,504

(22) Filed: May 16, 2022

(65) Prior Publication Data

US 2022/0276946 A1 Sep. 1, 2022

Related U.S. Application Data

(63) Continuation of application No. 16/321,481, filed as application No. PCT/CN2016/092215 on Jul. 29, 2016, now Pat. No. 11,334,463.

(51) Int. Cl.
G06F 11/34 (2006.01)
G06F 9/455 (2018.01)

(52) U.S. Cl.
CPC ...... *G06F 11/3423* (2013.01); *G06F 9/45558* (2013.01); *G06F 11/3428* (2013.01); *G06F 2009/45591* (2013.01)

(58) Field of Classification Search
CPC ............ G06F 11/3006; G06F 11/3409; G06F 11/3423; G06F 11/3428; G06F 11/3452;
(Continued)

(56) References Cited

U.S. PATENT DOCUMENTS

| 7,277,826 | B2 | 10/2007 | Castelli et al. |
| 11,334,463 | B2* | 5/2022 | Yang .................... G06F 11/3423 |
| 2013/0145220 | A1* | 6/2013 | Lv .......................... G06F 11/073 |
| | | | 714/47.1 |

OTHER PUBLICATIONS

U.S. Appl. No. 17/745,504, filed May 16, 2022.
(Continued)

*Primary Examiner* — John H Le
(74) *Attorney, Agent, or Firm* — WORKMAN NYDEGGER

(57) ABSTRACT

Techniques and systems for detecting leakage of computing resources in cloud computing architectures are described. In some implementations, first data may be obtained that indicates usage of a computing resource, such as non-volatile memory, volatile memory, processor cycles, or network resources, by a group of computing devices included in a cloud computing architecture. The first data may be used to determine reference data that may include a distribution of values of usage of the computing resource by the group of computing devices. Second data may also be collected that indicates usage of the computing resource by the group of computing devices during a subsequent time frame. The second data may be evaluated against the reference data to determine whether one or more conditions indicating a leak of the computing resource are satisfied.

20 Claims, 14 Drawing Sheets

(58) Field of Classification Search
CPC ............. G06F 11/3476; G06F 9/45558; G06F 2021/81; G06F 2021/815; G06F 2009/45591
USPC ........................................................ 702/186
See application file for complete search history.

(56) References Cited

OTHER PUBLICATIONS

"Summons to Attend Oral Proceedings Issued in European Patent Application No. 16910156.5", Mailed Date: Apr. 7, 2022, 14 Pages. (MS# 360009-EP-EPT).

"Notice of Allowance Issued in European Patent Application No. 16910156.5", dated Nov. 29, 2022, 13 Pages. (MS#360009-EP-EPT).

U.S. Appl. No. 16/321,481, filed Jul. 29, 2016.

"Notice of Allowance Issued in European Patent Application No. 16910156.5", dated Mar. 10, 2023, 2 Pages. (MS# 360009-EP-EPT).

\* cited by examiner

DETECTION OF COMPUTING RESOURCE LEAKAGE IN CLOUD COMPUTING ARCHITECTURES

CROSS-REFERENCE TO RELATED APPLICATIONS

This application is a continuation of U.S. patent application Ser. No. 16/321,481 filed on Jan. 29, 2019, entitled "DETECTION OF COMPUTING RESOURCE LEAKAGE IN CLOUD COMPUTING ARCHITECTURES," which issued as U.S. Pat. No. 11,334,463 on May 17, 2022, which claims the benefit of and priority to PCT Application Serial No. PCT/CN16/92215 filed on Jul. 29, 2016, and entitled "DETECTION OF COMPUTING RESOURCE LEAKAGE IN CLOUD COMPUTING ARCHITECTURES," both of which applications are incorporated herein by reference in their entirety.

BACKGROUND OF THE INVENTION

Service providers may implement cloud computing architectures to provide services to customers. Typically, cloud computing architectures include a large number of physical computing devices. In some cases, a cloud computing architecture may include, hundreds of thousands of physical computing devices, or millions, or more, that may be arranged across different physical locations in data centers. Each physical computing device may run a set of services or agents for infrastructure management purposes. The number of service instances or agent instances running in physical computing devise may number in the millions. The physical computing devices of a cloud computing architecture may host virtual machines or containers. In various implementations, each physical computing device may be utilized to implement one or more virtual machines or containers. Thus, in some instances, the number of virtual machines included in a cloud computing architecture may number in the millions. Each virtual machine or container may run a set of customer services, the number of customer service instances may number in the thousands or more.

An infrastructure service/agent instance or a customer service instance may utilize a number of computing resources to perform operations related to providing services to customers. For example, or other software components, such as instances of operating systems, executing on physical computing devices of cloud computing architectures may utilize processor cycles, volatile memory storage space, non-volatile memory storage space, network capacity, and so forth to provide services to customers. In some situations, the computing resources utilized by the software components of the physical computing devices may increase in a manner that is relatively slow and out of proportion with the computing resources typically used to provide services to customers of the service provider. In some cases, the increase in the utilization of the computing resources may be caused by software defects, e.g., allocated memory or handles from the computing operation system are not released after a normal usage. The disproportionate use of computing resources by the software components executing on the physical computing devices of the cloud computing architecture may affect the performance of the cloud computing architecture and cause disruptions in providing services to customers of the service provider.

BRIEF SUMMARY

Techniques and systems for detecting slowly increasing patterns of computing resource usage of millions of cloud service instances are described. Such patterns in many cases indicate resource leakage which are caused by software defects, for example, a piece of memory is not released after the normal use. In some implementations, first data may be obtained that indicates usage of a computing resource, such as non-volatile memory, volatile memory, processor cycles, or network resources, by a group of computing devices included in a cloud computing architecture. The first data may be used to determine reference data that may include a distribution of values of usage of the computing resource by the group of computing devices. Second data may also be collected that indicates usage of the computing resource by the group of computing devices during a subsequent time frame. The second data may be evaluated against the reference data to determine whether one or more conditions indicating an increase pattern of usage of the computing resource are satisfied. One or more corrective actions may be identified based at least partly on detecting an unusual increase pattern of usage of a computing resource. In addition, one or more user interfaces may provide information regarding computing devices that are associated with leaks of computing resources and/or information indicating software components executed by the computing devices that may be associated with a leak of a computing resource.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION OF THE PREFERRED EMBODIMENTS

Figure 1:
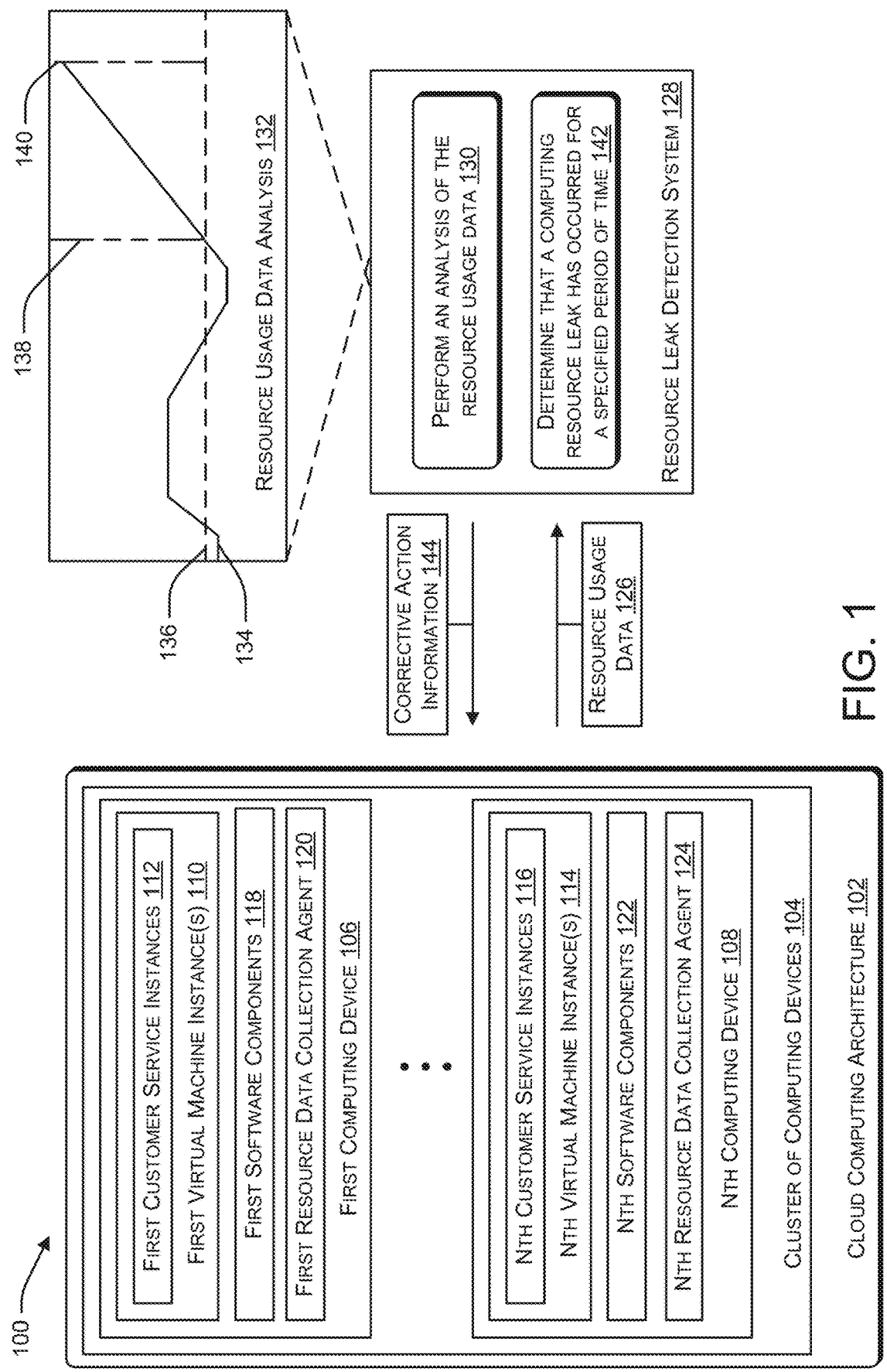
FIG. 1 is a diagram of an example environment to detect the leakage of computing resources.

Described herein are systems and processes to detect patterns of increasing computing resource usage in cloud computing architectures. In some cases, a computing resource leak may be identified when the computing resource leak has been occurring for a threshold period of time. Such patterns of computing resource leakage may indicate the possibility of computing resource leakage. In particular, the systems and processes described herein may more accurately identify computing resource leakage than conventional systems and processes.

In particular implementations, service providers may offer services to customers using computing resources of a cloud computing architecture. The detection of computing resource usage by portions of a cloud computing architecture may provide an indication that the computing resources utilized by portions of a cloud computing architecture may be greater than a typical amount of computing resources used to provide services to customers. For example, the systems described herein may determine that a pattern of usage of a computing resource may be increasing and greater than a typical pattern of usage of the computing resource for at least a threshold period of time. The increased usage of computing resources may cause the performance of portions of the cloud computing architecture to decrease. A decrease in performance of a cloud computing architecture may cause a disruption to the services provided to customers of a service provider.

A cloud computing architecture of a service provider may include a number of physical computing devices that host a number of virtual machines to provide services to a customer of the service provider. As used herein, the term "virtual machine" refers to a software implementation of a physical computing environment. In some cases, a plurality of instances of virtual machines may be executing on a single physical machine. Additionally, a cluster of physical computing devices may be used to host a plurality of instances of virtual machines for a customer of a service provider. The physical computing devices of a cloud computing architecture may also execute instances of software components to provide services to a customer of the service provider. The software components may include instances of an infrastructure service/agent and/or customer service instances. In some cases, multiple instances of an infrastructure service/agent, multiple customer service instances, or both may be executing on a single physical computing device.

A service provider may obtain a number of specifications from a customer with regard to computing services and configure a number of instances of virtual machines to provide the computing services to the customer. In some cases, in the course of providing the computing services to the customer, the usage of one or more computing resources may increase above the expected usage for implementing the customer specifications. For example, an amount of random access memory (RAM) allocated on the physical computing devices implementing instances of the instances of an infrastructure service/agent, customer service instances, or other software components used to provide the specifications to the customer may increase beyond a threshold amount of RAM usage. In another example, an amount of processor cycles utilized by the physical computing devices implementing the instances of virtual machines used to provide the specifications to the customer may increase beyond a threshold amount of processing time.

In particular situations, the increased usage of a computing resource above the expected usage may be referred to herein as a computing resource "leak" or "leakage" of a computing resource. In some scenarios, a computing resource leak may be caused by a computing resource being allocated for one or more instances of an infrastructure service/agent, one or more instances of customer service instances, or a physical computing device to perform one or more operations, but the computing resource is not deallocated in response to the completion of the one or more operations. When the computing resource is not deallocated for a period of time, the usage of the computing resource may increase to a level that affects the operation of one or more virtual machines, one or more physical computing devices, or both.

In implementations described herein, systems and techniques are described that monitor the usage of computing resources in a cloud computing architecture to identify situations where the usage of computing resources has deviated from an expected usage of the computing resources. In particular implementations, systems may collect data from a number of physical computing devices of a cloud computing architecture over a period of time that indicates usage of one or more computing resources by the physical computing devices. The data may be used to produce reference data that may serve as a baseline for expected computing resource usage of the physical computing devices. The baseline data may be different for different groups of physical computing devices due to differences in configurations between the groups of physical computing devices, differences in software being executed by the groups of physical computing devices, differences in virtual machines being implemented by the groups of physical computing devices, differences in workload for the groups of physical computing devices, or combinations thereof.

As the physical computing devices of a cloud computing architecture collect data regarding usage of computing resources by the physical computing devices, the computing resource usage data may be analyzed with respect to the baseline data to determine a set of parameters that characterize the normal usage patterns, which will be further used to detect whether or not a leak of a computing resource is taking place. One or more conditions may be specified to indicate a leak of a computing resource based at least partly on the baseline data. The techniques and systems described herein are directed to evaluating computing resource usage data obtained from physical computing devices of cloud computing architectures in relation to reference data indicating baseline usage of computing resources by the computing devices in order to determine whether predetermined conditions are satisfied that indicate a probability that a leak of computing resources is taking place.

The techniques and systems described herein are different from conventional threshold based systems. The conventional threshold based systems simply set a threshold amount of usage of a computing resource and when the threshold is reached, a leak of a computing resource is indicated. The conventional threshold based systems fail to take into account the different amounts of computing resources that different groups of physical computing devices may utilize. The conventional threshold based systems fail to consider the usage of computing resources by physical computing devices at various times and how the usage of computing resources by the physical computing devices may change over time. Additionally, the thresholds utilized by conventional systems can be difficult to determine and are often inaccurate. Thus, conventional threshold based systems may provide indications of computing resource leakage in situations where a computing resource leak is not actually occurring. Also, conventional threshold based systems can fail to identify computing resource leaks due to a threshold being set improperly. Furthermore, the techniques and systems described herein are highly scalable and may be utilized to efficiently and accurately identify leaks of computing resources across thousands to millions of computing devices in cloud computing architectures.

These and various other example features will be apparent from a reading of the following description and a review of the associated drawings. However, the claimed subject matter is not limited to implementations that solve any or all disadvantages or provide any of the benefits noted in any part of this disclosure.

FIG. 1 is a diagram of an example environment 100 to detect the usage of computing resources. The environment 100 includes a cloud computing architecture 102. The cloud computing architecture 102 may be used to provide computing services to customers. In some cases, the computing services may be related to hosting one or more websites of a customer and managing traffic to and from the websites. In other situations, the computing services may be associated with performing complex calculations and/or a large number of calculations for a customer where tens or hundreds of computing devices, or more, are utilized to execute operations concurrently to process data in a time frame specified by the customer. Additionally, the computing services may be directed to storing data for a customer that may be accessed in a variety of different locations via a network. For example, the cloud computing architecture 102 may store media files that may be accessible by one or more customers via a network coupled to the cloud computing architecture 102. Further, the cloud computing architecture 102 may provide database management services, such that data may be stored and searched using the cloud computing architecture 102. In additional examples, the cloud computing architecture 102 may be used to provide services related to predictive analyses based on one or more datasets. The cloud computing architecture 102 may also be used to host applications that are accessible to users. In particular implementations, the cloud computing architecture 102 may provide virtual private network (VPN) services that provides access to one or more applications that may be executed by the cloud computing architecture 102. In still other implementations, the cloud computing architecture 102 may provide services related to the encryption of data being stored by the cloud computing architecture 102 and restrict access to data stored by the cloud computing architecture 102 to users with proper authentication credentials.

The cloud computing architecture 102 may include one or more groups of physical computing devices, such as the group of computing devices 104. The group of computing devices 104 may include a first computing device 106 up to a Nth computing device 108. In some implementations, the group of computing devices 104 may be placed in a datacenter that is located in a particular geographic region. Although the illustrative example of FIG. 1, shows that the group of physical computing devices 104 includes three computing devices, in other implementations, the group of physical computing devices 104 may include a greater number of computing devices or physical computing devices.

The group of physical computing devices 104 may implement a number instances of virtual machines 112. The instances of virtual machines 112 may perform operations using the computing resources of at least one of the computing devices 106, 108, 110 of the group of computing devices 104. The first computing device 106 may host one or more first virtual machine instances 110. In some cases, the cloud computing architecture 102 may be associated with a service provider and the first virtual machine instances 110 may perform operations to provide services to a customer of the service provider. In particular implementations, the first virtual machine instances 110 may perform operations related to website hosting and/or application hosting for a customer of a service provider. In particular, the first virtual machine instances 110 may implement one or more first customer service instances 112. The first customer service instances 112 may perform operations directed to providing services to customers of the service provider. The first customer service instances 112 may utilize computing resources of the first computing device 106 to provide the services to the customers of the service provider. Additionally, the Nth computing device 108 may host one or more Nth virtual machine instances 114 that implement one or more Nth customer service instances 116 to provide services to one or more customers of a service provider associated with the cloud computing architecture 102.

The computing devices 106, 108 of the group of computing devices 104 may include respective software components and monitoring agents. For example, the first computing device 106 may include first software components 118 and a first resource data collection agent 120 and the Nth computing device 108 may include Nth software components 122 and a Nth resource data collection agent 124. Although the illustrative example of FIG. 1 shows that the first resource data collection agent 120 is separate from the first software components 118 and that the Nth resource data collection agent 124 is separate from the Nth software components 122, in other implementations, the first resource data collection agent 120 may be included in the first software components 118 and the Nth resource data collection agent 124 may be included in the Nth software components 122. In still other implementations, one or more of the first software components 118 may perform at least a portion of the operations performed by the first resource data collection agent 120 and one or more of the Nth software components may perform at least a portion of the operations of the Nth resource data collection agent 124.

In particular implementations, the software components 118, 122 may include one or more software components that obtain data related to event logs, traces, handles, combinations thereof, and the like. In illustrative implementations, the software components 118, 122 may include a set of instances of cloud infrastructure services/agents for cloud management purposes. The software components 118, 122 may also include one or more software components that obtain data related to the usage of computing resources by the computing devices 106, 108. For example, the software components 118, 122 may obtain data indicating hard disk space allocation, processor cycles, RAM allocation, network resource allocation, or combinations thereof. Additionally, the software components 118, 122 may include one or more components that perform load balancing to distribute operations related to the hosting of the virtual machine instances 110, 114 by the computing devices 106, 108. Further, the software components 118, 122 may include one or more software components directed to managing data flow to and from the computing devices 106, 108. In some implementations, the software components 118, 122 may include one or more software components associated with remote access to applications hosted via the virtual machine instances 110, 114. To illustrate, the software components 118, 122 may include remote desktop software components. In addition, the software components 118, 122 may include one or more software components that control access to information using authentication procedures. The software components 118, 122 may also include one or more software components related to the encryption of information and the decryption of information utilized by the virtual machine instances 110, 114. In various implementations, the software components 118, 122 may include one or more software components to configure the computing devices 106, 108 to host the virtual machine instances 110, 114. For example, the software components 118, 122 may include one or more software components to deploy a particular operating system and/or a particular software package to be executed by the computing devices 106, 108. In another example, the software components 118, 122 may include one or more software components to configure communications interfaces of the computing devices 106, 108.

The resource data collection agents 120, 124 may obtain data indicating the usage of computing resources by the computing devices 106, 108. In particular implementations, the usage of computing resources by the computing devices 106, 108 may be performed by the first customer service instances 112, the Nth customer service instances 116, the first software components 118, the Nth software components 122, or combinations thereof. The data obtained by the resource data collection agents 120, 124 may be utilized to detect leaks of computing resources. The resource data collection agents 120, 124 may operate in conjunction with the software components 118, 122 to obtain data indicating the usage of computing resources by the computing devices 106, 108. In some cases, the resource data collection agents 120, 124 may obtain data indicating the usage of computing resources by the computing devices 106, 108 independent of the software components 118, 122.

The resource data collection agents 120, 124 and/or one or more of the software components 118, 122 may send resource usage data 126 to a resource leak detection system 128. The resource leak detection system 128 may, at 130, perform an analysis of the resource usage data 126. The analysis of the resource usage data 126 may include determining reference data that may be used to detect a computing resource leak. For example, the resource leak detection system 128 may analyze the resource usage data 126 to determine computing resource usage by the computing devices 106, 108 over a specified period of time. In some cases, the reference data may provide a baseline that subsequent computing resource usage will be compared to when attempting to detect leakage of computing resources. As new resource usage data is obtained from the computing device 106, 108, the reference data may be continuously updated or periodically updated to reflect the effect of the new resource usage data on the baseline computing device resource usage.

In a particular implementation, the resource leak detection system 128 may analyze the resource usage data 126 to determine the average usage of one or more computing resources by the computing devices 106, 108 with respect to the hosting of the virtual machine instances 110, 114 and the implementation of the customer service instances 112, 116 during a specified period of time. In other implementations, the resource leak detection system 128 may analyze the resource usage data 126 to determine the median usage of one or more computing resources by the computing devices 106, 108 with respect to the hosting of the virtual machine instances 110, 114 and the implementation of the customer service instances 112, 116 during a specified period of time. Additionally, the resource leak detection system 128 may analyze the resource usage data 126 to determine a standard deviation of computing resource usage by the computing devices 106, 108 with respect to the hosting of the virtual machine instances 110, 114 and the implementation of the customer service instances 112, 116. The resource usage data 126 may be collected over a period of time, such that a history of the resource usage data may be utilized by the leak detection system 128 to determine a median, an average, and/or a standard deviation with respect to computing resource usage by the computing devices 106, 108 with respect to the hosting of the virtual machines 110, 114 and the implementation of the customer service instances 112, 116. In additional implementations, the resource leak detection system 128 may analyze the resource usage data 126 to determine a distribution of the usage of one or more computing resources by the computing devices 106, 108 over a specified period of time with respect to the hosting of the virtual machine instances 110, 114 and the implementation of the customer service instances 112, 116. For example, the distribution of the usage of one or more computing resources by the computing devices 106, 108 may indicate a Gaussian distribution of the usage of the one or more computing resources by the computing devices 106, 108 with respect to the hosting of the virtual machine instances 110, 114 and the implementation of the customer service instances 112, 116.

The resource leak detection system 128 may also analyze the usage of one or more computing resources by the computing devices 106, 108 with respect to particular software components 118, 122. To illustrate, the resource leak detection system 128 may determine usage of one or more computing resources in relation to a load balancing agent executed by the computing devices 106, 108. In another example, the resource leak detection system 128 may determine usage of one or more computing resources in relation to a software component that configures the computing devices 106, 108 to host the virtual machine instances 110, 114.

The resource leak detection system 128 may produce a resource usage data analysis 132. The resource usage data analysis 132 may include a first representation 134 that indicates usage of a computing resource over a period of time. In addition, the resource usage data analysis 132 may include a second representation 136 that indicates a reference level of usage of the computing resource, such as a median and a standard deviation, of usage of the computing resource or an average of usage of the computing resource. The resource usage data analysis 132 also includes a first representation 138 of a first time that may include a candidate start time for a leak of a computing resource. Further, the resource usage data analysis 132 includes a second representation 140 of a second time that may include a current time.

At 142, the resource leak detection system 128 may determine that a computing resource leak has occurred for a specified period of time. For example, the resource leak detection system 128 may determine a difference between the first time indicated by the first representation 138 and the second time indicated by the second representation 140. When the resource leak detection system 128 determines that the difference between the first time and the second time is greater than a predetermined period of time, the resource leak detection system 128 may determine that a possible leak of a computing resource is taking place. In addition, the resource leak detection system 128 may determine a difference between the value of the computing resource at the first time and the value of the computing resource at the second time. The resource leak detection system 128 may also determine that a possible leak of a computing resource is taking place based at least partly on the difference between the value of the usage of the computing resource at the first time and the value of the usage of the computing resource at the second time.

In some implementations, the resource leak detection system 128 may identify a leak of a computing resource based on determining that a pattern of usage of a computing resource by a group of computing devices is different from a reference pattern of usage by a threshold amount. The reference pattern may indicate typical or normal usage of a computing resource by computing devices. Further, the resource leak detection system 128 may identify a leak of a computing resource based on the pattern of usage of a computing resource deviating from a reference pattern by a specified amount over a threshold period of time. In some cases, when the pattern of usage of a computing resource is different from a reference pattern for less than a threshold period of time, a leak of a computing resource may not be occurring.

In response to determining that a leak of a computing resource is taking place, the resource leak detection system 128 may identify one or more corrective actions to alleviate the computing resource leak. In some cases, the resource leak detection system 128 may determine that a restart of the computing devices 106, 108 may alleviate the computing resource leak. In other situations, the resource leak detection system 128 may determine that a software update may alleviate the computing resource leak. In particular implementations, the resource leak detection system 128 may determine that an update of software provided by a customer of a service provider that is executed by the virtual machine instances 112 may alleviate the computing resource leak. In additional implementations, the resource leak detection system 128 may determine that an update of one or more of the software components 118, 122 may alleviate the computing resource leak. After identifying a corrective action to alleviate the computing resource leak, the resource leak detection system 128 may send corrective action information 144 to the computing devices 106, 108. The computing devices 106, 108 may utilize the corrective action information 144 to reduce the usage of one or more computing resources by the computing devices 106, 108 and alleviate the computing resource leak.

Figure 2:
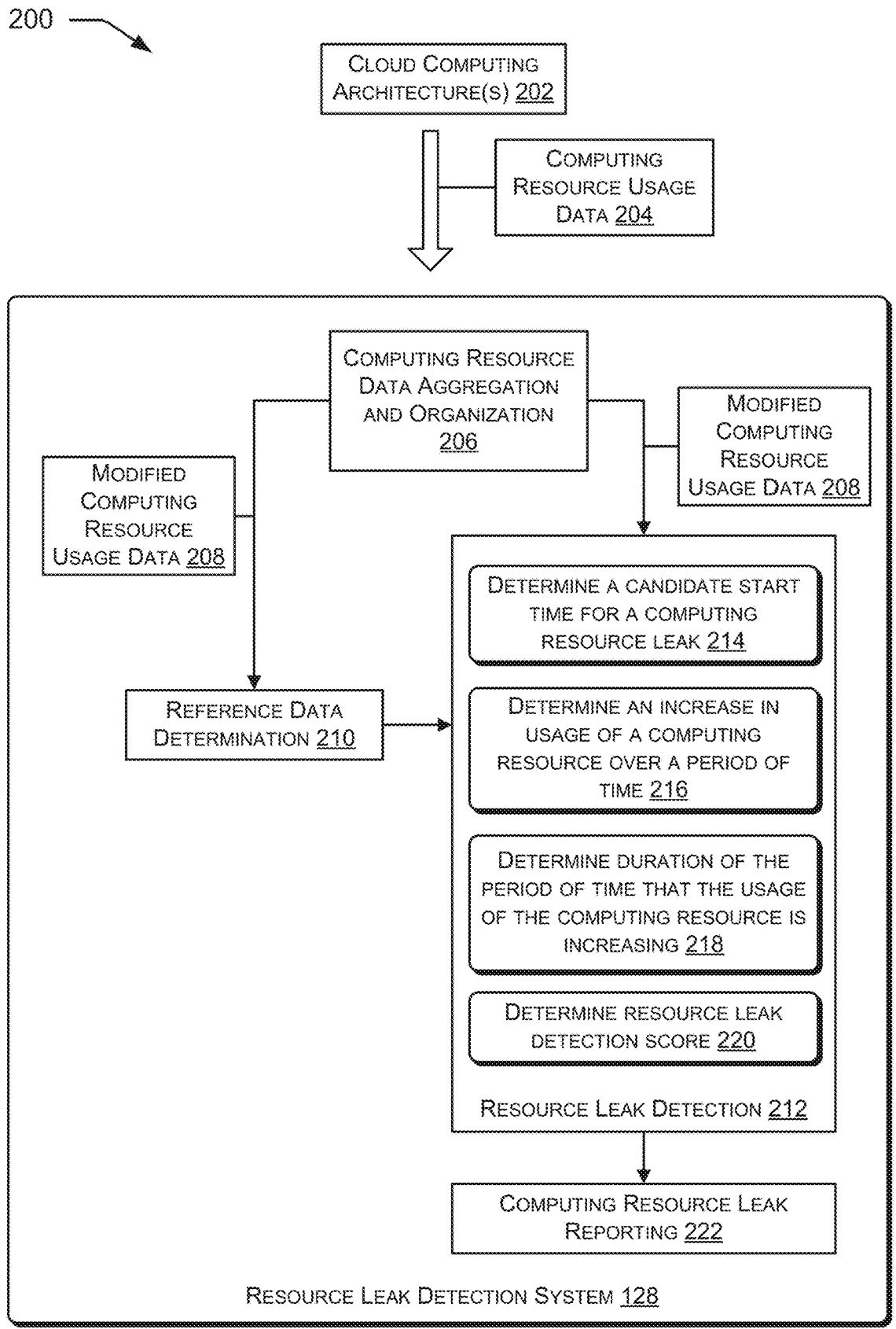
FIG. 2 is a diagram of an additional example environment to detect the leakage of computing resources.

FIG. 2 is a diagram of an additional example environment 200 to detect the leakage of computing resources in cloud computing architectures. The environment 200 includes one or more cloud computing architectures 202 and the resource leak detection system 128 of FIG. 1. The cloud computing architectures 202 may include a number of physical computing devices. In addition, the cloud computing architectures 202 may be associated with one or more service providers that provide services to customers by utilizing computing resources of the physical computing devices of the cloud computing architectures 202. In some implementations, the cloud computing architectures 202 may include the cloud computing architecture 102 of FIG. 1.

The cloud computing architectures 202 may send computing resource usage data 204 to the resource leak detection system 128. The computing resource usage data 204 may indicate an amount of usage of a number of computing resources by the physical computing devices of the cloud computing architectures 202. For example, the computing resource usage data 204 may indicate allocation of RAM over a period of time by physical computing devices of the cloud computing architectures 202. In another example, the computing resource usage data 204 may indicate a number of processor cycles completed over a period of time by physical computing devices of the cloud computing architectures 202. In additional examples, the computing resource usage data 204 may indicate allocation of disk space over a period of time by physical computing devices of the cloud computing architectures 202. In further examples, the computing resource usage data 204 may indicate allocation of network resources over a period of time by physical computing devices of the cloud computing architectures 202.

The computing resource usage data 204 may, in some cases, be related to particular software components executed by the physical computing devices of the cloud computing architectures 202. For example, the computing resource usage data 204 may indicate usage of computing resources by one or more service instances executed by the physical computing devices of the cloud computing architectures 202. In another example, the computing resource usage data 204 may indicate usage of computing resources by one or more cloud infrastructure agents/components executed by the physical computing devices of the cloud computing architectures 202. In this way, as explained more below, the resource leak detection system 128 may perform data reduction and aggregation, reference data determination, and resource leak detection for particular software components executed by the physical computing devices of the cloud computing architectures 202.

The resource leak detection system 128 may perform computing resource data aggregation and organization 206. The computing resource data aggregation and organization 206 may generate modified computing resource usage data 208. The resource leak detection system 128 may produce the modified computing resource usage data 208 by reducing the dataset associated with usage of one or more of the computing resources by the physical computing devices of the cloud computing architectures 202. The resource leak detection system 128 may reduce a dataset associated with a computing resource by aggregating the computing resource usage data 204 at a rate that is less than the rate at which the computing resource usage data 204 was collected. For example, the computing resource usage data 204 may include RAM allocation collected every one second. In this situation, the resource leak detection system 128 may produce the modified computing resource usage data 208 by identifying RAM allocation values collected at a different time interval. To illustrate, the leak detection system 128 may identify RAM allocation values from the computing resource usage data 204 at intervals of one minute, 5 minutes, 10 minutes, 20 minutes, 30 minutes, 40 minutes, 50 minutes, 60 minutes, 90 minutes, 120 minutes, 150 minutes, or 180 minutes. In this way, the amount of data being processed by the resource leak detection system 128 is reduced and the computing resources utilized by the resource leak detection system 128 to detect a leak of a computing resource are also reduced. Additionally, by reducing the amount of data processed by the resource leak detection system 128, the amount of noise associated with analyzing the computing resource usage data 204 to detect a leak of a computing resource is also reduced, which provides a more accurate determination of computing resource leaks. That is, the number of outlying data points and/or the number of unusable data points in the computing resource usage data 204 is reduced in the modified computing resource usage data 208. Additionally, the maximum values of computing resource usage may be utilized to reduce an amount of computing resource usage data 204 being analyzed by the resource leak detection system 128. In some cases, the computing resource usage data 204 may be filtered according to the following equation:

$$V_{hourly} = \text{MAX}_{i=0}^{12} V_{i*5\_minute}.$$

Furthermore, the number of outlying data points and/or the number of unusable data points in the computing resource usage data 204 may be reduced by other techniques. In some cases, these data points may be referred to herein as "noise." In some implementations, a moving average may be calculated to reduce the amount of noise in detecting computing resource leaks. For example, an average of values of computing resource usage may be determined for a first period of time and analyzed by the resource leak detection system 128. As time progresses, the resource leak detection system 128 may shift the time period used to determine the average computing resource value forward by a specified amount. Thus, at least a portion of the values of the computing resource obtained during the first period of time are no longer utilized by the resource leak detection system 128 to detect computing resource leaks. Instead, the values collected during the subsequent period of time are used to calculate average computing resource usage and determine whether a leak of computing resources is taking place.

The computing resource data aggregation and organization 206 may also include grouping portions of the computing resource usage data 204. In particular implementations, the resource leak detection system 128 may identify patterns of computing resource usage for certain groups of physical computing devices of the cloud computing architectures 202. The resource leak detection system 128 may organize the computing resource usage data according to the groups of physical computing devices that produce similar computing resource usage patterns over time. In an illustrative example, the resource leak detection system 128 may identify a group of physical computing devices that are associated with hosting instances of virtual machines to provide services for a particular customer of a service provider and that have similar patterns of computing resource allocation, such as similar patterns of volatile memory allocation, similar patterns of non-volatile memory allocation, similar patterns of processor cycle usage, similar patterns of network resource allocation, combinations thereof, and so forth.

The modified computing resource usage data 208 may be utilized by the resource leak detection system 128 in a number of ways. In particular implementations, the resource leak detection system 128 may perform reference data determination 210 using at least a portion of the modified computing resource usage data 208. The reference data determination 210 may include determining reference data for usage of computing resources by computing devices that may be used to determine that a leak of computing resources is taking place. For example, the reference data determination 210 may produce reference data that may be utilized as baseline computing resource usage data that may be compared to current computing resource usage data to determine whether a computing resource leak is occurring. In some cases, the reference data may include baseline patterns of usage of computing resources for one or more groups of computing devices included in the cloud computing architectures 202.

The resource leak detection system 128 may determine the reference data using computing resource usage data collected over a period of time. For example, the resource leak detection system 128 may determine the reference data for a group of computing devices of the cloud computing architectures based at least partly on at least 5 days of computing resource usage data, at least 10 days of computing resource usage data, at least 20 days of computing resource usage data, at least 30 days of computing resource usage data, at least 40 days of computing resource usage data, at least 50 days of computing resource usage data, at least 60 days of computing resource usage data, at least 75 days of computing resource usage data, or at least 90 days of computing resource usage data. In various implementations, the resource leak detection system 128 may utilize the latest computing resource usage data obtained during a specified time period to determine the reference data. In this way, the reference data may be updated as new computing resource reference data is obtained. Thus, in a situation where the resource leak detection system 128 determines the reference data using 60 days of computing resource usage data, the resource leak detection system 128 may disregard computing resource usage data that is older than 60 days when determining the reference data.

The reference data determination 210 may include the resource leak detection system 128 collecting computing resource usage data for particular computing resources and for particular computing devices over a period of time. The resource leak detection system 128 may analyze the modified computing resource usage data 208 to determine a median usage of computing resources by the computing devices of the cloud computing architectures 202. The resource leak detection system 128 may also analyze the modified computing resource usage data 208 to determine an average usage of computing resources by the computing devices of the cloud computing architectures 202. Additionally, the resource leak detection system 128 may determine a standard deviation for the usage of computing resources by the computing devices of the cloud computing architectures 202.

Further, the resource leak detection system 128 may determine a distribution of the usage of computing resources by the computing devices of the cloud computing architectures 202. In particular implementations, the resource leak detection system 128 may determine a value for the amount of usage of a computing resource that is greater than or equal to 1% of the total values of usage of the computing resource included in the modified computing resource usage data 208. The resource leak detection system 128 may also determine a value for the amount of usage of a computing resource that is greater than or equal to 25% of the total values for the amount of usage of the computing resource included in the modified computing resource usage data 208. Additionally, the resource leak detection system 128 may determine a value for the amount of usage of a computing resource that is greater than or equal to 70% of the total values for the usage of the computing resource included in the modified computing resource usage data 208. Further, the resource leak detection system 128 may determine a value for the amount of usage of a computing resource that is greater than or equal to 99% of the values for the usage of the computing resource included in the modified computing resource usage data 208. The resource leak detection system 128 may also determine other threshold values for the amount of usage of a computing resource, such as values for the amount of usage of a computing resource that is greater than or equal to 10%, greater than or equal to 30%, greater than or equal to 40%, greater than or equal to 60%, greater than or equal to 75%, greater than or equal to 80%, and/or greater than or equal to 90% of the total values for the usage of the computing resource included in the modified computing resource usage data 208. In some cases, the reference data determination 210 performed by the resource leak detection system 128 may include producing a Gaussian distribution of computing resource usage.

The reference data determination 210 may also include determining the differences between values of computing resource usage. The differences between values of computing resource usage may be referred to herein as "difference information." For example, the leak detection system 128 may determine a difference between a value of usage of a computing resource at a first time and a value of usage of a computing resource at a second time. To illustrate, the resource leak detection system 128 may analyze the modified computing resource usage data 208 according to the formula:

$$\text{diff}_i = v_i - v_{i-1},$$

where $v_{i-1}$ is the value of usage of a computing resource at a first time and $v_i$ is the value of usage of the computing resource at a second time that occurs before the first time. In various implementations, the values of usage of a computing resource $v_i$ and $v_{i-1}$ may be a pair of values of usage of a computing resource that are adjacent in a series of values of usage of the computing resource. The resource leak detection system 128 may determine median values using difference information for values of usage of computing resources by the computing devices of the cloud computing architectures 202. In addition, the resource leak detection system 128 may determine average values using difference information for values of usage of computing resources by the computing devices of the cloud computing architectures 202. Further, the resource leak detection system 128 may determine the standard deviation using difference information for values of the usage of computing resources by the computing devices of the cloud computing architectures 202.

The resource leak detection system 128 may determine a distribution of the difference information for values of usage of computing resources by the computing devices of the cloud computing architectures 202. In particular implementations, the resource leak detection system 128 may determine a difference value for the amount of usage of a computing resource that is greater than or equal to 1% of the total difference values for the usage of the computing resource included in the modified computing resource usage data 208. The resource leak detection system 128 may also determine a difference value for the amount of usage of a computing resource that is greater than or equal to 25% of the total difference values for the usage of the computing resource included in the modified computing resource usage data 208. Additionally, the resource leak detection system 128 may determine a difference value for the amount of usage of a computing resource that is greater than or equal to 70% of the total difference values for the usage of the computing resource included in the modified computing resource usage data 208. Further, the resource leak detection system 128 may determine a difference value for the amount of usage of a computing resource that is greater than 99% of the total difference values for the usage of the computing resource included in the modified computing resource usage data 208. The resource leak detection system 128 may also determine other threshold difference values for the amount of usage of a computing resource, such as a maximum difference value, a minimum difference value, respective difference values for the amount of usage of a computing resource that are greater than 10%, greater than 30%, greater than 40%, greater than 60%, greater than 75%, greater than 80%, and/or greater than 90% of the total difference values for the usage of the computing resource included in the modified computing resource usage data 208. In some cases, the reference data determination 210 performed by the resource leak detection system 128 may include producing a Gaussian distribution of difference values for computing resource usage by computing devices of the cloud computing architectures 202.

In some cases, the resource leak detection system 128 may determine reference data for particular computing resources. For example, the resource leak detection system 128 may determine reference data for volatile memory allocation by computing devices of the cloud computing architectures 202. In another example, the resource leak detection system 128 may determine reference data for non-volatile memory allocation by computing devices of the cloud computing architectures 202. In additional examples, the resource leak detection system 128 may determine reference data for processor cycle usage by computing devices of the cloud computing architectures 202. In further examples, the resource leak detection system 128 may determine reference data for network resource usage by computing devices of the cloud computing architectures 202. Additionally, the resource leak detection system 128 may determine reference data for a combination of usage of computing resources by computing devices of the cloud computing architectures 202. To illustrate, the resource leak detection system 128 may determine reference data for usage of at least one of non-volatile memory, volatile memory, processor cycles, network resources, or input/output resources.

The resource leak detection system 128 may also determine reference data for particular software components executed by the computing devices of the cloud computing architectures 202. In some cases, the resource leak detection system 128 may determine reference data for the usage of one or more computing resources by one or more software components of computing devices of the cloud computing architectures 202. For example, the resource leak detection system 128 may determine reference data for one or more service instances and/or one or more cloud infrastructure components/agents executed by the computing devices of the cloud computing architectures 202. In particular implementations, the resource leak detection system 128 may determine reference data for a load balancing software component, a network communications software component, a configuration software component, a diagnostic software component, a computing resource allocation software component, a remote access software component, an authentication software component, or combinations thereof, executed by the computing devices of the cloud computing architectures 202.

In particular implementations, the reference data determination 210 may also include threshold amounts of increases in values of usage of computing resources and threshold amounts of time that may be used to determine when a leak is occurring with respect to a computing resource. For example, the resource leak detection system 128 may determine increases in values of usage of a computing resource over periods of time that may cause a disruption to services provided via the cloud computing architectures 202. Further, the reference data determination 210 may continue as new computing resource usage data is obtained from the cloud computing architectures 202. That is, the reference data produced from the reference data determination 210 may be updated based on the new computing resource usage data obtained from the cloud computing architectures 202.

The resource leak detection system 128 may perform operations directed to resource leak detection 212 using the modified computing resource usage data 208. In particular, the resource leak detection system 128 may utilize the reference data and the modified computing resource usage data 208 to detect computing resource leaks. For example, at 214, the resource leak detection system 128 may determine a candidate start time for a computing resource leak. In some situations, the candidate start time may be identified based at least partly on one or more conditions related to the computing resource usage. The one or more conditions may be related to an amount of change in values of computing resource usage over a period of time in relation to one or more previous values of computing resource usage. The candidate start times may be modified as computing resource usage changes over time.

In addition, at 216, the resource leak detection system 128 may determine an increase in usage of a computing resource over a period of time. To illustrate, the leak detection system 128 may determine that a difference between a current value of usage of a computing resource that is included in the modified computing resource usage data 208 is greater than a value of usage of the computing resource at a previous time. In some cases, an increase in usage of a computing resource over time may be used by the leak detection system 128 to determine a computing resource usage metric. In particular, an increase in usage of a computing resource over time with respect to a reference value may be used to identify a leak of a computing resource. In particular implementations, the reference value may include a difference between a value of usage of a computing resource that is greater than 75% of a set of computing resource usage values and a value of usage of the computing resource that is greater than 25% of the set of computing resource usage values. Further, at 218, the resource leak detection system 128 may determine a duration of a period of time that the usage of the computing resource is increasing. In addition to utilizing the increase in usage of the computing resource over the period of time from 214 to detect a leak of a computing resource, the leak detection system 128 may also utilize the duration of the period of time that the usage of the computing resource is increasing.

The resource leak detection system 128 may, at 220, determine a resource leak detection score. The resource leak detection score may indicate a similarity of usage of one or more computing resources by a group of computing devices with a baseline/reference pattern of usage of the one or more computing resources by the group of computing devices.

The resource leak detection score may be based at least partly on a number of factors that indicate a computing resource leak may affect services provided by the cloud computing architectures 202. In some implementations, the resource leak detection score may be determined based at least partly on an increase in usage of a computing resource over a period of time. Also, the resource leak detection score may be determined based at least partly on a duration of a period of time that the usage of the computing resource is increasing. In various implementations, the factors used to determine the resource leak detection score may be associated with a respective weighting. The weighting for factors used to determine the resource leak detection score may indicate a relative importance of a corresponding factor in determining whether a leak of a computing resource is occurring that may cause a disruption to services provided via the cloud computing architectures 202.

In some instances, the resource leak detection system 128 may determine that a computing resource leak is taking place that may disrupt services provided via the cloud computing architectures 202 based at least partly on the resource leak detection score. For example, the resource leak detection system 128 may determine that the resource leak detection score is above a threshold score to identify a leak of a computing resource that may be causing or may potentially cause a disruption to services provided by the cloud computing architectures 202. After determining that a resource leak detection score is above a threshold score, the resource leak detection system 120 may determine one or more corrective actions that may be performed to alleviate the computing resource leak.

The resource leak detection system 128 may also perform computing resource leak reporting 222. The computing resource leak reporting 222 may include providing one or more user interfaces that indicate usage of computing resources by computing devices of the cloud computing architectures 202. In some cases, the one or more user interfaces produced by the resource leak detection system 128 may indicate leaks of computing resources utilized by computing devices of the cloud computing architectures 202. The one or more user interfaces produced by the resource leak detection system 128 may be accessible to users associated with a service provider that utilizes one or more of the cloud computing architectures 202 to provide services to customers. In particular implementations, the one or more user interfaces produced by the resource leak detection system 128 may be accessible to customer of service providers utilizing one or more of the cloud computing architectures 202 to provide services to the customers.

Figure 3:
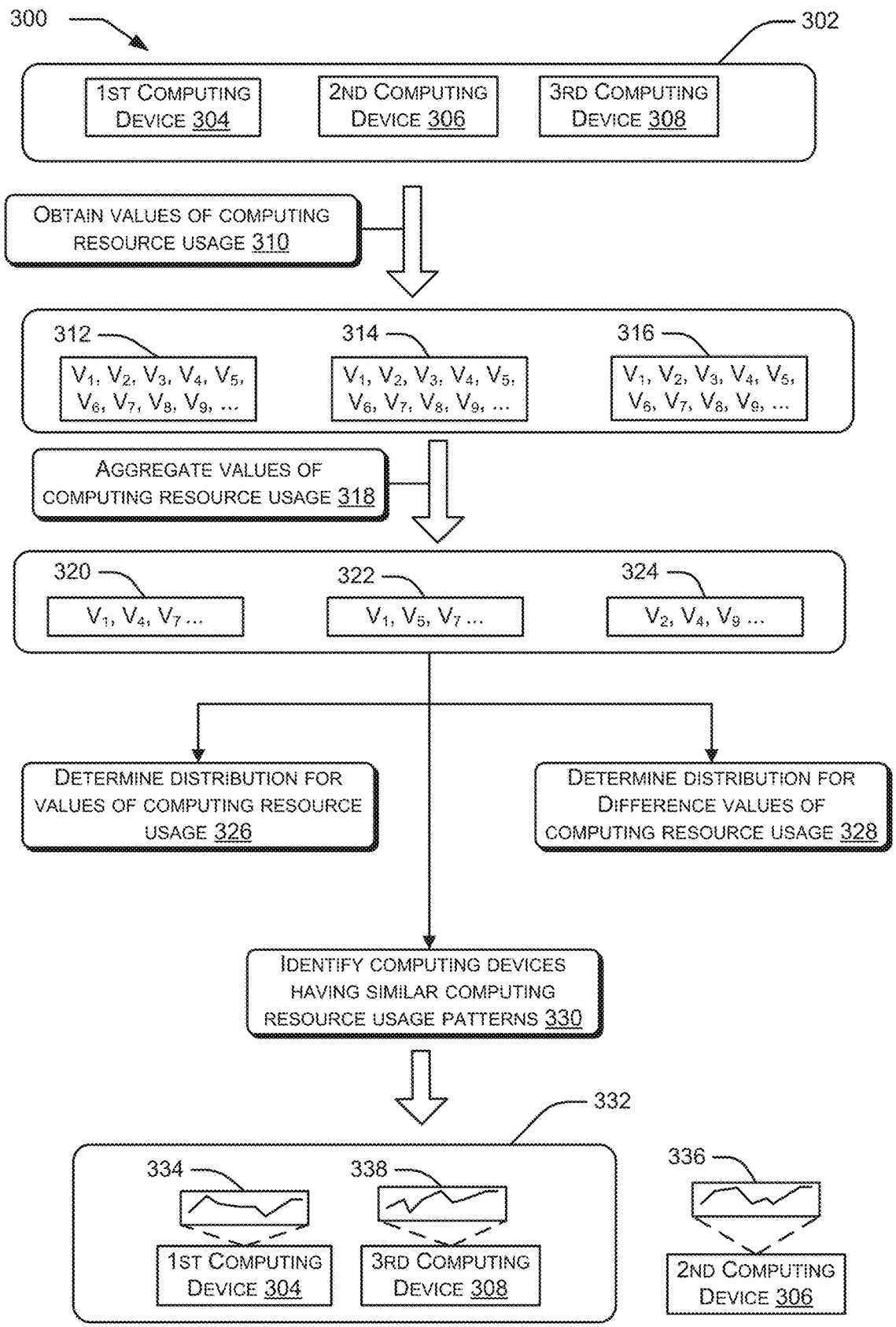
FIG. 3 illustrates a framework of an example process to organize and aggregate data indicating usage of computing resources by computing devices of cloud computing architectures.

FIG. 3 illustrates a framework 300 of an example process to organize and aggregate data indicating usage of computing resources by computing devices of cloud computing architectures. In some implementations, the framework 300 may be related to one or more portions of the computing resource data aggregation and organization 206 of FIG. 2. The framework 300 includes a first group of computing devices 302. The group of computing devices 302 includes a first computing device 304, a second computing device 306, and a third computing device 308, The computing devices 304, 306, 308 may be executing software components that are utilizing computing resources. In addition, the computing devices 304, 306, 308 may produce patterns of computing resource usage for one or more of the software components executing on the computing devices 304, 306, 308. In some examples, the computing devices 304, 306, 308 may execute one or more service instances of a cloud computing architecture that utilize computing resources. In other examples, the computing devices 304, 306, 308 may execute one or more cloud infrastructure agents/components that utilize computing resources.

The first group of computing devices 302 may include computing devices that are located in the same physical location. In some cases, the first group of computing devices 302 may include computing devices that host one or more instances of virtual machines that provide the same services or the same types of services. In addition, the first group of computing devices 302 may include computing devices that host one or more virtual machines that provide services for the same customer. The first group of computing devices 302 may also have similar workload requirements. For example, the first group of computing devices 302 may have similar memory allocation specifications, similar processor cycle specifications, similar network resource specifications, or combinations thereof. Further, the first group of computing devices 302 may have similar configurations. To illustrate, the first group of computing devices 302 may be executing the same software components. The software components may include, in some cases, service instances to provide services to customers of a service provider associated with cloud computing architectures and/or cloud infrastructure components/agents. In another illustration, the first group of computing devices 302 may include similar hardware components. In some implementations, the first group of computing devices 302 may include similar communications network interfaces, similar non-volatile memory devices, similar volatile memory devices, similar processors, or combinations thereof.

The first group of computing devices 302 may utilize one or more computing resources in executing the software components related to hosting instances of virtual machines and providing services via a cloud computing architecture. For example, the computing devices 304, 306, 308 may allocate non-volatile memory space in executing the software components related to hosting instances of virtual machines and providing services via a cloud computing architecture. In another example, the computing devices 304, 306, 308 may allocate volatile memory space in executing the software components related to hosting instances of virtual machines and providing services via a cloud computing architecture. In an additional example, the computing devices 304, 306, 308 may allocate processor cycles in executing the software components related to hosting instances of virtual machines and providing services via a cloud computing architecture. In further examples, the computing devices 304, 306, 308 may allocate network resources in executing the software components related to hosting instances of virtual machines and providing services via a cloud computing architecture.

The framework 300 also includes, at 310, collecting values of computing resource usage from a number of computing devices. The values of computing resource usage may indicate usage of one or more computing resources by computing devices at particular times. In some cases, the values of the computing resource usage may indicate usage of one or more computing resources at a time interval. For example, the values of computing resource usage may be collected at intervals of 0.5 seconds, 1 second, 5 seconds, 10 seconds, 30 seconds, 1 minute, 2 minutes, 5 minutes, 10 minutes, and so forth. In the illustrative example of FIG. 3, values of computing resource usage may include a first group of computing resource usage values 312 corresponding to usage of computing resources by the first computing device 304, a second group of computing resource usage values 314 corresponding to usage of computing resources by the second computing device 306, and a third group of computing resource usage values 316 corresponding to usage of computing resources by the third computing device 308. In an illustrative example, the values $V_1$-$V_9$ included in the groups of computing resource usage values 312, 314, 316 may represent an amount of volatile memory allocated at 5 second intervals. In another illustrative example, the values $V_1$-$V_9$ included in the groups of computing resource usage values 312, 314, 316 may represent an amount of non-volatile memory allocated at 5 second intervals. In an additional illustrative example, the values $V_1$-$V_9$ included in the groups of computing resource usage values 312, 314, 316 may represent a number of processor cycles being completed at 5 second intervals. In a further illustrative example, the values $V_1$-$V_9$ included in the groups of computing resource usage values 312, 314, 316 may represent network resource usage (e.g., expressed in bandwidth) at 5 second intervals.

The framework 300 also includes, at 318, aggregating values of computing resource usage. In some implementations, the number of values included in the groups of computing resource usage values 312, 314, 316 may be reduced to additional groups, such as a fourth group 320 of computing resource usage values that corresponds to the first group 312, a fifth group 322 of computing resource usage values that corresponds to the second group 314, and a sixth group 324 of computing resource usage values that corresponds to the third group 316. For example, the number of computing resource usage values included in the groups of computing resource usage values 312, 314, 316 may be reduced from 9 values to 3 values in the groups of computing resource usage values 320, 322, 324. In some implementations, the number of values included in the groups 312, 314, 316 may be reduced by selecting a computing resource usage value from each of the groups at a time interval that is greater than the time interval at which the values included in the groups 312, 314, 316 were collected. In the illustrative example of FIG. 3, the groups of computing resource usage values 320, 322, 324 may include 3 values for the usage of computing resources instead of the 9 values included in the groups of computing resource usage values 312, 314, 316.

In a particular illustrative implementation, the values included in the groups 312, 314, 316 may be collected at 5 second intervals and the number of values included in the groups 320, 322, 324 may be reduced by obtaining a value from each the groups 312, 314, 316 every 15 seconds. In some cases, the maximum value for a particular time interval for the usage of the computing resource included in each of the groups 312, 314, 316 may be selected to produce the computing resource usage values included in each of the groups 320, 322, 324. In other instances, the average value for the usage of the computing resource included in each of the groups 312, 314, 316 for intervals of 15 seconds may be determined to produce the computing resource usage values included in the groups 320, 322, 324. Other implementations may utilize different criteria for obtaining the values included in the groups 320, 322, 324, such as determining a value every 15 seconds that is greater than at least 40% of the values included in each of the groups 312, 314, 316 or determining a value every 15 seconds that is greater than 75% of the values included in each of the groups 312, 314, 316. In other implementations, a value of the usage of a computing resource to be included in the second groups 320, 322, 324 may be selected at intervals of every 5 minutes, every 10 minutes, every 20 minutes, every 30 minutes, every 40 minutes, every 50 minutes, every 60 minutes, every 2 hours, every 6 hours, every 10 hours, or every 12 hours.

After determining the second groups of computing resource usage data 320, 322, 324, the framework 300 may include, at 326, determining a distribution for the usage of the computing resources over time for each of the computing devices 304, 306, 308 included in the first group of computing devices 302. In various implementations, the distribution of the usage of a computing resource for the first computing device 304 may utilize the values of the usage of the computing resource included in the fourth group 320 to determine a median value, an average value, a standard deviation, a value that is greater than 1% of the values included in the fourth group 320, a value that is greater than 25% of the values included in the fourth group 320, a values that is greater than 75% of the values included in the fourth group 320, a value that is greater than 99% of the values included in the fourth group 320, a maximum value of the values included in the fourth group 320, or combinations thereof. In a similar manner, the median, average, standard deviation, 1% value, 25% value, 75% value, and/or 99% value for the usage of the computing resource by the computing devices 306, 308 may also be determined to produce a distribution for the usage of the computing resource by the computing devices 306, 308 using data from the groups 322, 324.

Additionally, the framework 300, at 328, may determine a distribution for difference values of computing resource usage by the computing devices 304, 306 308 using the values included in the groups 320, 322, 324. For example, the difference between values included in the groups may be determined and the difference values may be used to determine a distribution for the usage of computing resources by the computing devices 304, 306, 308. To illustrate, for the first computing device 304, a first difference value between the computing resource usage values $V_1$ and $V_4$ may be determined and a second difference value between the computing resource usage values $V_4$ and $V_7$ may be determined. The first difference value and the second difference value may be utilized to determine a median difference value, an average difference value, a standard deviation for the difference values, a difference value that is greater than 1% of the difference values included in the fourth group 320, a difference value that is greater than 25% of the difference values included in the fourth group 320, a difference value that is greater than 75% of the difference values included in the fourth group 320, a difference value that is greater than 99% of the difference values included in the fourth group 320, a maximum difference value for the difference values included in the fourth group 320, or combinations thereof to produce a distribution for the difference values determined for the fourth group 320. In a similar manner, distributions for difference values may be determined for the computing devices 306, 308 using difference values determined using the groups 322, 324.

Further, the framework 300, at 330, may identify computing devices within the first group of computing devices 302 having similar computing resource usage patterns to produce a second group of computing devices 332. The second group of computing devices 332 may be identified based at least partly on similarities between the computing resource usage patterns of the computing devices. In the illustrative example of FIG. 3, utilization of computing resources by the first computing device 304 may be represented by a first computing resource usage pattern 334, utilization of computing resources by the second computing device 306 may be represented by a second computing resource usage pattern 336, and utilization of computing resources by the third computing device 308 may be represented by a third computing resource usage pattern 338. Additionally, in some implementations, the computing resource usage patterns 334, 336, 338 may indicate a usage of computing resources by one or more software components executed by the computing devices 304, 306, 308. In particular implementations, the computing resource usage patterns 334, 336, 338 may indicate usage of computing resources by a service instance executed by the computing devices 304, 306, 308. In other scenarios, the computing resource usage patterns 334, 336, 338 may indicate usage of computing resources by an instance of a cloud architecture agent/component executed by the computing devices 304, 306, 308.

In particular implementations, the resource leak detection system 128 of FIG. 1 and FIG. 2 may compare the computing resource usage patterns 334, 336, 338 and determine similarity metrics for the computing resource usage patterns 334, 336, 338 with respect to one another. The resource leak detection system 128 may then group the computing devices 304, 306, 308 according to the similarity metrics determined for the computing resource usage patterns 334, 336, 338. In some cases, the similarity metrics determined for the computing resource usage patterns 334, 336, 338 may indicate that one or more of the computing resource usage patterns 334, 336, 338 correspond with another one of the computing resource usage patterns 334, 336, 338 within a threshold amount. In the illustrative example of FIG. 3, the second group of computing devices 332 includes the first computing device 304 and the third computing device 308 based on similarities between the first computing resource usage pattern 334 and the third computing resource usage pattern 338.

By implementing the operations described in the illustrative example of FIG. 3, a resource leak detection system, such as the resource leak detection system 128 of FIG. 1 and FIG. 2, may measure the health of one or more cloud computing architectures or portions of one or more cloud computing architectures. For example, the resource leak detection system 128 may analyze at least the first computing resource usage pattern 334 and the third computing resource usage pattern 338 to determine whether a computing resource leak is taking place with respect to the first computing device 304, the third computing device 308, a software component executed by the first computing device 304, and/or a software component executed by the third computing device 308.

Figure 4:
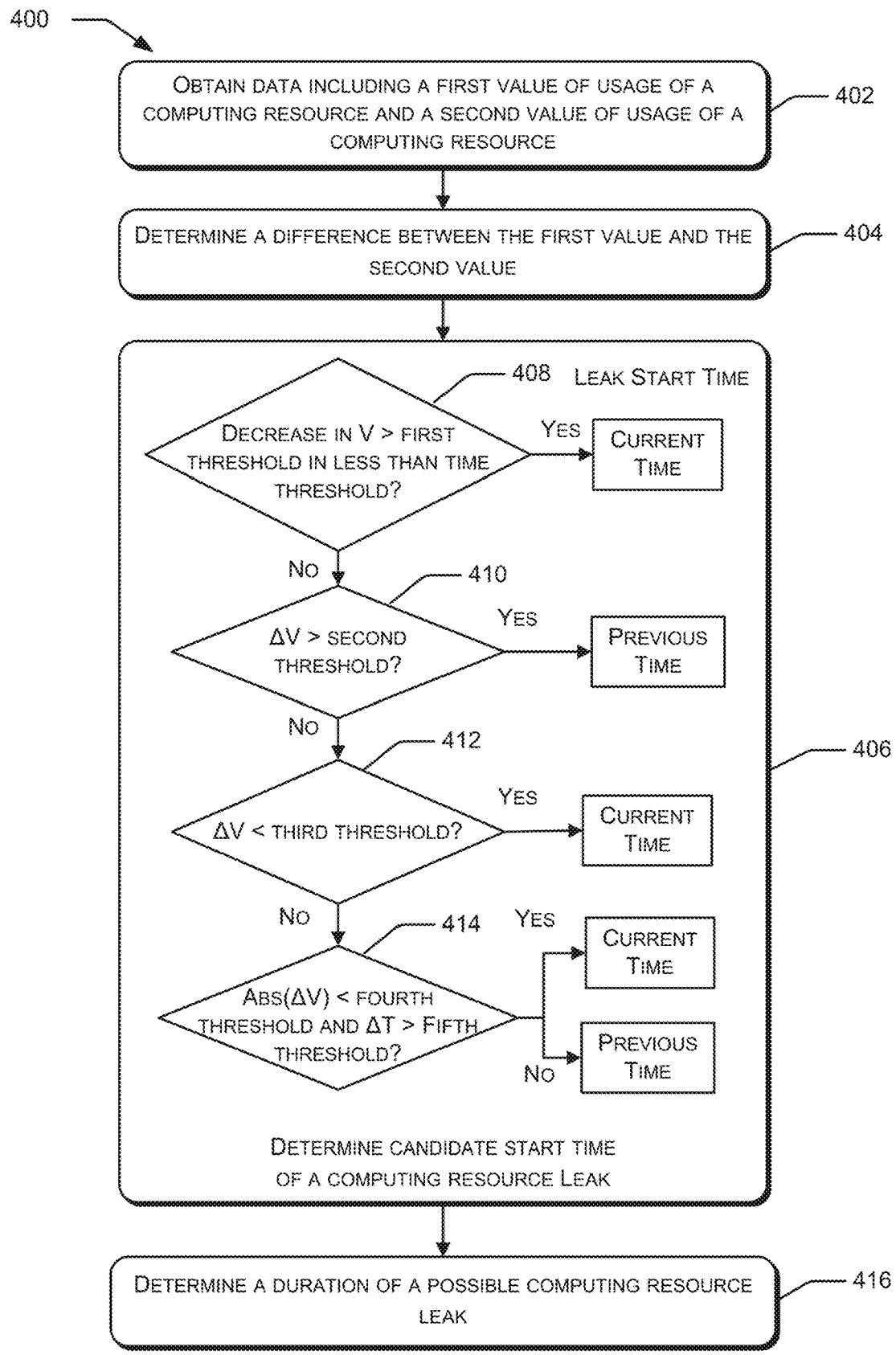
FIG. 4 is a flow diagram of an example process to determine a duration of a computing resource leak.

FIG. 4 is a flow diagram of an example process 400 to determine a duration of a computing resource leak. At 402, the process 400 includes obtaining data including a first value of usage of a computing resource and a second value of usage of a computing resource. The computing resource may be associated with implementing one or more instances of software components executed by a computing device of a cloud computing architecture. The computing resource may include allocation of volatile memory, allocation of non-volatile memory, processor cycles completed, usage of network resources, or combinations thereof. In some cases, the first value may be associated with a first time and the second value may be associated with a second time that is after the first time. For example, values of computing resources may be collected sequentially at a specified time interval and the second value of the usage of the computing resource may be collected after the specified time interval has elapsed from a time that the first value of the usage of the computing resource was collected. Additionally, the first value and the second value may include a value selected from a plurality of values that were obtained within a specified time interval. To illustrate, the first value of the usage of the computing resource may include a maximum value from a plurality of values obtained during a first time interval and the second value of the usage of the computing resource may include a maximum value from a plurality of values obtained during a second time interval that follows the first time interval. In another illustration, the first value of the usage of the computing resource may include an average value or a median value determined from a plurality of values of the usage of the computing resource obtained during a first time interval and the second value of the usage of the computing resource may include an average value or a median value determined from a plurality of values of the usage of the computing resource obtained during a second time interval that follows the first time interval.

The process 400 also includes, at 404, determining a difference between the first value and the second value. The difference between the first value and the second value may be used in one or more calculations to determine whether or not a leak of the computing resource is taking place. For example, the following equations may be used to determine values, such as values of reference data, that may be used to determine a duration of a computing resource leak:

$$D = \text{Distance}(V_{75\%} - V_{25\%}),$$
$$\Delta V = \frac{V_T - V_{T_0}}{D},$$
$$\Delta T = T - T_0,$$

where $V_{75\%}$ is a value of a computing resource that is greater than 75% of the values of a computing resource included in a data set and $V_{25\%}$ is a value of a computing resource that is greater than 25% of the values of the computing resource included in the data set. In some cases, the data set may a training data set used to determine reference data that provides a baseline for determining that a resource leak is occurring. In addition, $V_T$ is the value of a computing resource at a current time, T, and $V_{T_0}$ is a value of a computing resource at an initial time, To. To may indicate a candidate start time for a leak of a computing resource.

At 406, the process 400 includes determining a candidate start time of a computing resource leak. Determining a candidate start time of a computing resource leak may include determining whether a number of criteria are satisfied. For example, at 408, the process 400 may include determining whether a decrease in V is greater than a first threshold value in less than a time threshold. The first threshold may be a relatively large amount of a computing resource. For example, the first threshold may be at least one standard deviation, at least two standard deviations, at least three standard deviations, at least four standard deviations, or at least five standard deviations. Additionally, the time threshold may be a relatively short period of time, such as less than 8 hours, less than 4 hours, less than 2 hours, less than 1 hour, or less than 30 minutes. In this way, the operation 408 may be used to determine whether a restart of a computing device occurred, a configuration change (e.g., a software upgrade) has taken place with respect to the computing device, at least a portion of the non-volatile memory of the computing device has been cleared (e.g., a memory dump), or combinations thereof, since these events may result in a relatively large decrease in computing resource usage. In situations where the decrease in V is greater than the first threshold in less than the time threshold, the candidate leak start time may be set to the current time, T. In situations where the decrease in V is less that the first threshold within the time threshold, the process 400 may move to 410. At 410, the process 400 includes determining whether $\Delta V$ is greater than a second threshold. The second threshold may be a predetermined value that is part of reference data determined by analyzing the usage of computing resources by a group of computing devices over a period of time. In situations where $\Delta V$ is greater than the second threshold, usage of a resource may be continuing to increase. Thus, the candidate leak start time may remain as the initial time, $T_0$, and not be changed to the current time, T.

In instances where $\Delta V$ is not greater than the second threshold, the process 400 may move to 412 to determine whether the value of a computing resource at a current time has a value less than a third threshold. In some cases, the third threshold may indicate a decrease between the value of usage of the computing resource from the current time to a previous time. Based at least partly on determining that the value of the computing resource decreased from a previous time to the current time, the candidate leak start time may be set to the current time. In this way, a decrease in the value of usage of a computing resource may indicate that a leak of a computing resource is not taking place because the value of usage of a computing device decreases. In situations where the change in the value of usage of the computing resource is not greater than the second threshold or less than the third threshold, the process 400 may move to 414. At 414, the process 400 includes determining whether the absolute value of $\Delta V$ is less than a fourth threshold and determining that $\Delta T$ is greater than a fifth threshold. In particular, the fourth threshold may be set such that determining whether the absolute value of $\Delta V$ is less than the fourth threshold may indicate whether the value of usage of a computing resource has remained relatively constant or within a specified range for a period of time. In this way, relatively consistent usage of the computing resource does not indicate a resource leak is occurring and the candidate start time for a leak of the computing resource is set to the current time. Additionally, determining whether the absolute value of $\Delta V$ is less than the fourth threshold and that $\Delta T$ is greater than the fifth threshold may also indicate that the usage of a computing resource increased for a period of time, but then regressed. Thus, in this situation, the candidate leak start time is set to the current time. In other situations, the absolute value of $\Delta V$ may be greater than the fourth threshold and $\Delta T$ may be less than the fifth threshold, in which case, a leak of a computing resource may be occurring and the candidate start time may remain as the initial candidate start time.

After determining that the candidate start time for a possible leak of a computing resource is either a current time or an initial time, the process 400 may move to 416 where a duration of the possible leak of the computing resource is determined. In some cases, determining the duration of a potential leak of a computing resource may include repeating the performance of one or more of the operations 402, 404, 406, 408, 410, 412, 414. For example, as new data is received, the operations of 404, 406, 408, 410, 412, 414 may be repeated to determine whether a candidate start time for a leak of a computing resource is to be updated to a new current time or is to remain as an initial candidate start time. The duration of the potential leak of the computing resource may be used to determine whether or not a leak of a computing resource is occurring as explained in more detail with respect to FIG. 5.

Figure 5:
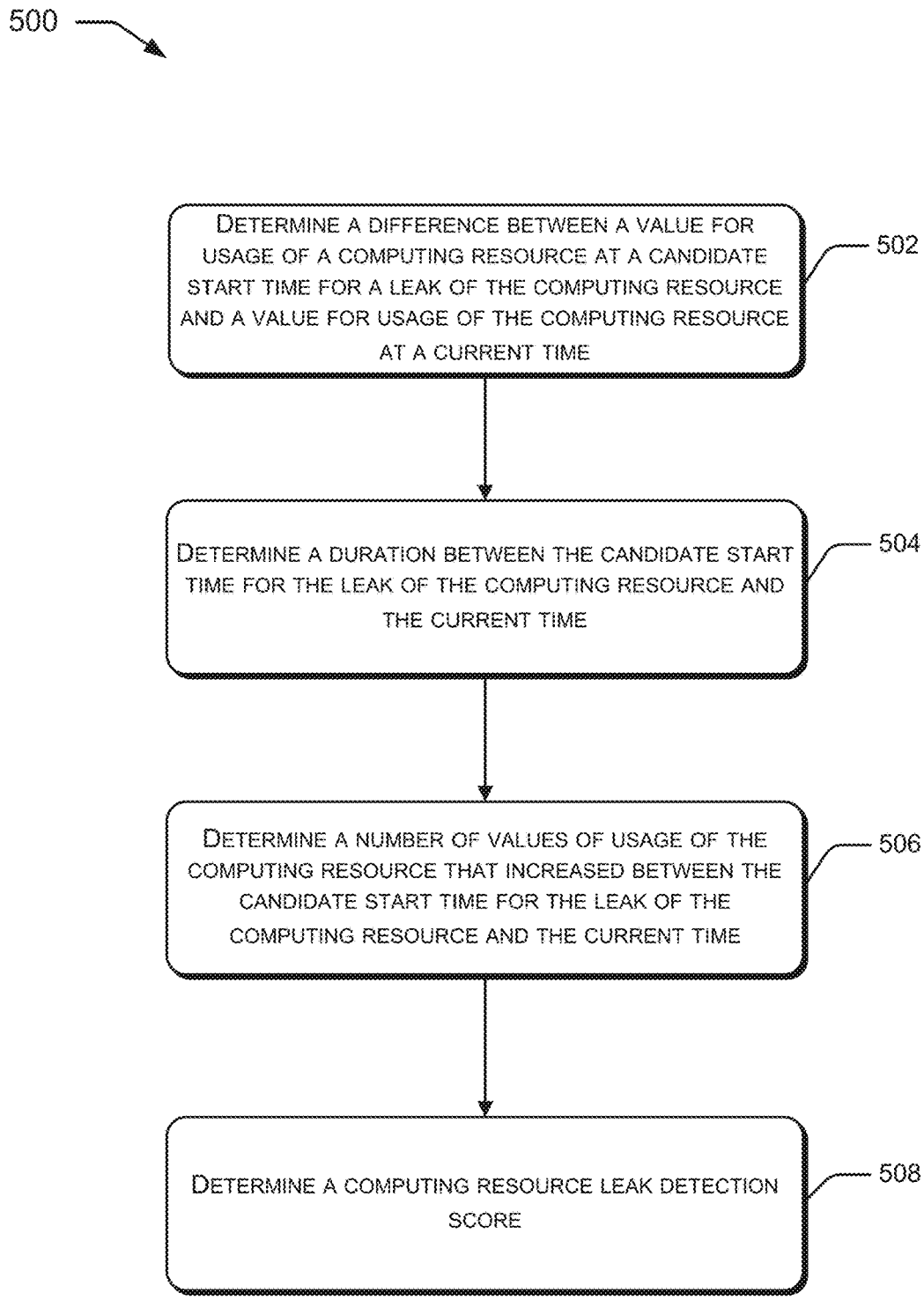
FIG. 5 is a flow diagram of an example process to determine a score for a computing resource leak and determine corrective action to alleviate the computer resource leak.

FIG. 5 is a flow diagram of an example process 500 to determine a score for a computing resource leak and determine corrective action to alleviate the computing resource leak. At 502, the process 500 includes determining a difference between a value for usage of a computing resource at a candidate start time for a leak of the computing resource and a value for usage of the computing resource at a current time. In some implementations, the operation 502 may be used to calculate the value $\Delta V$. In addition, at 504, the process 500 includes determining a duration between the candidate start time for the leak of the computing resource and a current time. In various implementations, the operation 504 may be used to calculate the value $\Delta T$. At 506, the process 500 includes determining a percentage of values of usage of the computing resource that increased between the candidate start time for the leak of the computing resource and the current time. In an illustrative example, the number of points that are increasing from the candidate start time for a computing resource leak and the current time may be determined using the following equations:

$$DecreasePoints_{T-T0} = \text{Count}_{i=T0}^{T}(diff_i < \text{threshold}),$$

$$\% \; I = \frac{TotalPoints_{T-T0} - DecreasePoints_{T-T0}}{TotalPoints_{T-T0}},$$

where % I indicates the number of data points that increased with respect to a previous data point between the candidate start time for the computing resource leak and the current time, $TotalPoints_{T-T0}$ indicates the total number of data points collected between the candidate start time for the computing resource leak and the current time, and $DecreasePoints_{T-T0}$ indicates a number of data points collected between the candidate start time for the computing resource leak and the current time that decreased with respect to previously collected data points.

Additionally, at 508, the process 500 includes determining a computing resource leak detection score. The computing resource leak detection score may be based at least partly on the difference between the value for usage of a computing resource at the candidate start time for a leak of the computing resource and the value for usage of the computing resource at the current time, the duration between the candidate start time for the leak of the computing resource and the current time, the number of values of usage of the computing resource collected between the candidate start time for the leak of the computing resource and the current time, or a combination thereof. In some cases, the computing resource leak detection score may also be based on one or more thresholds. In particular implementations, the computing resource leak detection score may be based at least partly on a determination that the difference between the value for usage of a computing resource at the candidate start time for a leak of the computing resource and the value for usage of the computing resource at the current time is greater than a threshold value for usage of a computing resource. Additionally, the computing resource leak detection score may be based at least partly on a determination that the duration between the candidate start time for the leak of the computing resource and the current time is greater than a threshold duration. Further, the computing resource leak detection score may be based at least partly on a determination that the number of values of usage of the computing resource that are increasing between the candidate start time for the leak of the computing resource and the current time is greater than a threshold number of points.

The computing resource detection score may also be based at least partly on one or more weights associated with one or more criteria used to determine the resource leak detection score. For example, the resource leak detection score may be based at least partly on the difference between the value for usage of a computing resource at the candidate start time for a leak of the computing resource and the value for usage of the computing resource at the current time, the duration between the candidate start time for the leak of the computing resource and the current time, the number of values of usage of the computing resource that are increasing between the candidate start time for the leak of the computing resource and the current time. The one or more weights may indicate a relative importance of one or more of the criteria used to determine the computing resource leak detection score. In some implementations, one or more weights used to determine the resource leak detection score may be determined using previously obtained computing resource usage data. In particular, previously obtained computing resource usage data may be analyzed from situations when computing resource leaks occurred to determine the relative importance of one or more factors that indicate the presence of the computing resource leak. In an illustrative example, the resource leak detection score may be determined using the equation:

Resource Leak Detection Score=$\alpha \Delta V + \beta$ % $I + \gamma \Delta T + \theta \text{Sigmoid}(V/D)$, where $\alpha$ is first a weight associated with the value for $\Delta V$, $\beta$ is second weight associated with a number of points having an increasing value of computing resource usage from a candidate start time of a computing resource leak to a current time, and $\gamma$ is a third weight associated with $\Delta T$. A fourth weight $\theta$ may be associated with the term Sigmoid (V/D) that is meant to take into account a situation where the value of usage of the computing resource may have a relatively high value for a candidate start time of a computing resource leak. In various implementations, the computing resource leak detection score may be based at least partly on three conditions being satisfied. For example, the computing resource leak detection score may not indicate that a computing resource leak is occurring unless the value of $\Delta V$ is greater than a first threshold value, the value of $\Delta T$ is greater than a second threshold, and the value of % I is greater than a third threshold. Thus, the process 500 may be used to identify computing resource leaks based on patterns of computing resource usage that are relatively continuously increasing beyond a baseline pattern of usage of the computing resources for a threshold period of time. In some cases, the threshold period of time may be on the order of days, week, or months. In various implementations, the resource leak detection score may be expressed as 0, 1, or a number in between 0 and 1. In an illustrative example, if the value of $\Delta V$ is less than a first threshold value, the resource leak detection score may be 0; if the value of $\Delta T$ is less than a second threshold value, the resource leak detection score may be 0; if the value of % I is less than a third threshold value, the resource leak detection score may be 0, if the current value of resource usage is less than an average value+a specified value, x, multiplied by the standard deviation, the resource leak detection score may be 0, or combinations thereof.

Figure 6:
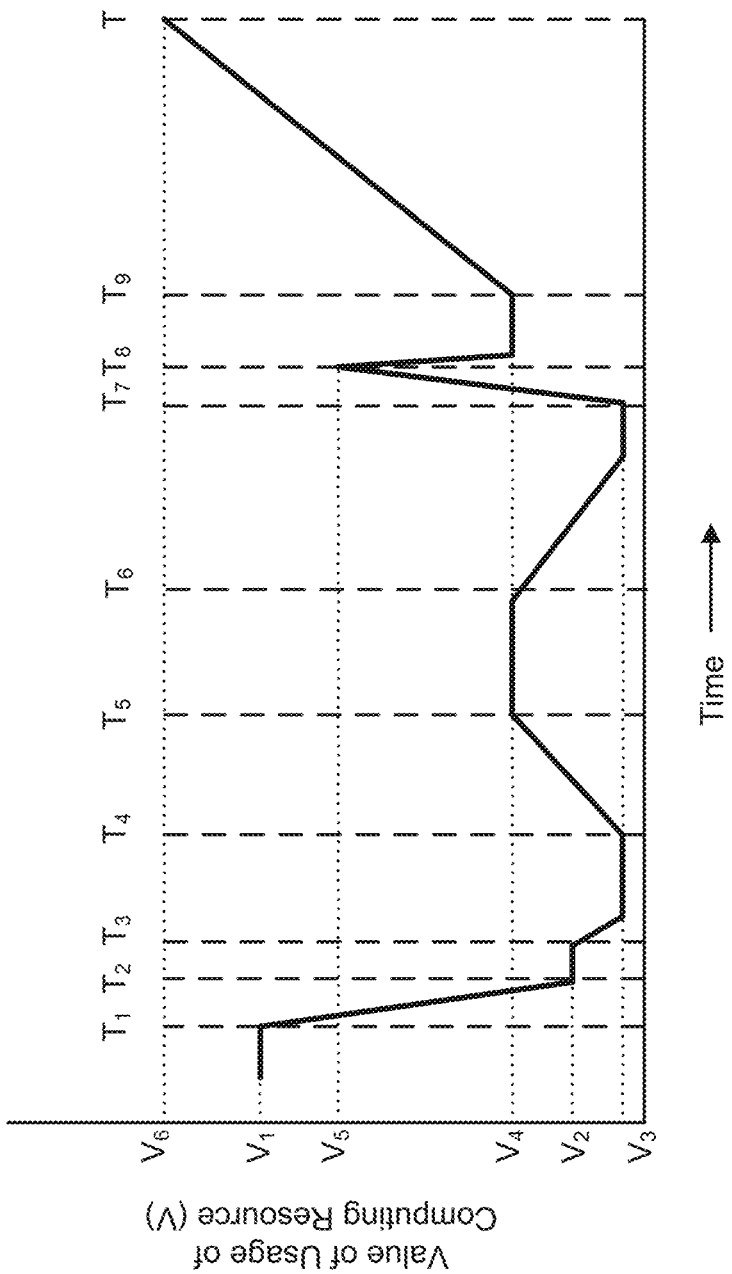
FIG. 6 is a diagram showing changes in the value of usage of a computing resource over time.

FIG. 6 is a diagram showing changes in the value of usage of a computing resource over time. The values of usage of the computing resource shown in FIG. 6 may indicate a pattern of usage of the computing resource and be analyzed with respect to a baseline pattern of usage of the computing resource. The values of usage of the computing resource illustrate a number of the situations described with respect to FIG. 4 and FIG. 5. In particular, FIG. 6 includes a first value of usage of a computing resource, $V_1$, associated with a first time $T_1$, a second value of usage of the computing resource $V_2$, associated with a second time $T_2$; a third value of usage of a computing resource, $V_3$, associated with a third time, $T_3$, a fourth value of usage of a computing resource, $V_4$, associated with a fourth time, $T_4$, a fifth value of usage of a computing resource $V_5$, associated with a fifth time, $T_5$, a sixth value of usage of a computing resource $V_6$, associated with a sixth time, $T_6$, and a seventh value of usage of a computing resource, $V_7$, associated with a seventh time, $T_7$.

In the illustrative example of FIG. 6, a relatively large decrease in the value of the usage of the computing resource from $V_1$ to $V_2$ may occur from $T_1$ to $T_2$. This situation corresponds to that described with respect to operation 408 in FIG. 4. In this case, a resource leak is not detected from $T_1$ to $T_2$ because the usage of the computing resource is decreasing from $T_1$ to $T_2$. In addition, the times from $T_1$ to $T_2$ are not candidate leak start times because of the decrease in usage of the computing resource from $T_1$ to $T_2$. In a particular implementation, the decrease in usage of the computing resource from $V_1$ to $V_2$ may be based at least partly on a configuration change of one or more computing devices, a restart of one or more computing devices, a release of an amount of the computing resource, or combinations thereof.

From time $T_3$ to $T_4$, the value of usage of the computing resource may decrease from $V_2$ to $V_3$. Thus, since the usage of the computing resource is decreasing from $T_3$ to $T_4$ and a leak of a computing resource is not occurring. In addition, the times from $T_3$ to $T_4$ are not candidate start times for a leak of a computing resource due to the decrease in the value of usage of the computing resource from $T_3$ to $T_4$. From $T_4$ to $T_5$, the value of the usage of the computing resource may increase from $V_3$ to $V_4$. In this scenario, due to the increase in the usage of the computing resource from $T_4$ to $T_5$, time $T_4$ may be considered a candidate start time for a computing resource leak. As time moves from $T_5$ to $T_6$, the value of usage of the computing resource does not increase and begins to decrease at time $T_6$ to $V_3$. Thus, a resource leak detection system, such as the resource leak detection system 128 of FIG. 1 and FIG. 2, may determine that a leak of the computing resource is not taking place.

From $T_7$ to $T_8$, the value of the usage of the computing resource increases from $V_3$ to $V_5$. In this illustrative situation, the change in the value of the usage of the computing resource may be greater than a threshold level. Thus, $T_7$ may be considered a candidate start time for a leak of the computing resource. The change in time from $T_7$ to $T_8$ and the number of points collected between $T_7$ and $T_8$ that are increasing may not be greater than respective threshold levels. In addition, the value of the usage of the computing resource decreases after $T_8$. After the value of the usage of the computing resource begins to decrease, the candidate start time may change from $T_7$ to another time that the value of the usage of the computing resource begins to increase. Accordingly, a resource leak detection system may determine that a leak of the computing resource is not occurring between $T_7$ and $T_8$. From $T_9$ until a current time, T, the value of the usage of the computing resource also begins to increase. Consequently, $T_9$ may be considered as a candidate time for a leak of the computing resource. Since the value of the usage of the computing resource increases to $V_6$ at the current time, T, a leak detection system may determine whether the change in the value of the usage of the computing resource from $V_4$ to $V_6$ is greater than a threshold amount, the duration from $T_9$ to T is greater than a threshold duration, and/or the number of data point increasing for the value of the usage of the computing resource from $T_9$ to T is greater than a threshold number of points to determine a computing resource leak detection score. In cases where the computing resource leak detection score is greater than a threshold score, the leak detection system may determine that a leak of the computing resource is occurring between $T_9$ and T, and determine one or more corrective actions to alleviate the leak of the computing resource.

Figure 7:
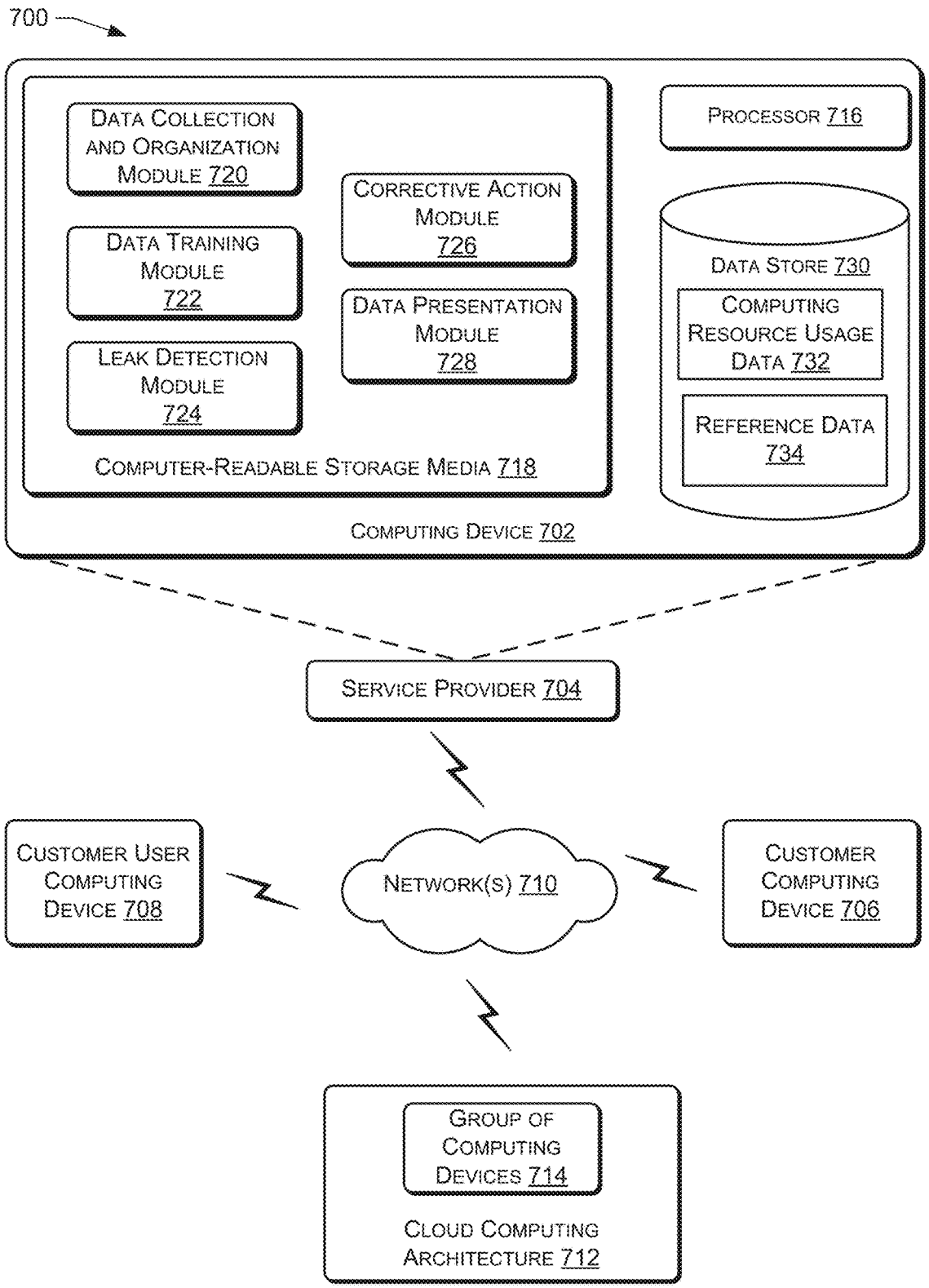
FIG. 7 is a block diagram illustrating an example system to detect leakage of computing resources in cloud computing architectures.

FIG. 7 is a block diagram illustrating an example system 700 to detect leakage of computing resources in cloud computing architectures. The system 700 includes a computing device 702 that may be used to perform at least a portion of the operations to detect leakage of computing resources in cloud computing architectures. The computing device 702 may be associated with a service provider 704 that provides services to customers. In particular implementations, the service provider 704 may provide services related to the hosting of applications, the hosting of websites, data storage, performing complex calculations, combinations thereof, and the like. In addition, the service provider 704 may implement one or more of the operations described with respect to a resource leak detection service, such as the resource leak detection service 128 of FIG. 1 and FIG. 2. The services provided by the service provider 704 may be accessed via a customer computing device 706, a customer user computing device 708, or both. The customer computing device 706 may be associated with a customer obtaining services from the service provider 704 and may provide specifications to the service provider 704 regarding the services obtained by the customer from the service provider 704. For example, the customer computing device 706 may provide information for websites that the service provider 704 is hosting on behalf of the customer. In another example, the customer computing device 706 may provide software to be implemented by the service provider 704 in relation to services obtained by the customer from the service provider 704.

The system 700 may also include a customer user computing device 708 that may access information and/or services provided by the service provider 704 on behalf of the customer. To illustrate, the customer user computing device 708 may include a browser application to access a website of the customer that is hosted by the service provider 704. In another illustration, the customer user computing device 708 may access an application of the customer that is hosted by the service provider 704. The customer computing device 706, the customer user computing device 708, or both may include a laptop computing device, a tablet computing device, a mobile communications device (e.g., a mobile phone), a wearable computing device (e.g., watch, glasses, fitness tracking device, a head mounted display, jewelry), a portable gaming device, combinations thereof, and the like.

The computing device 702 may include one or network interfaces (not shown) to communicate with other computing devices, such as the customer computing device 706 and/or the customer user computing device 708, via one or more networks 710. The one or more networks 710 may include one or more of the Internet, a cable network, a satellite network, a wide area wireless communication network, a wired local area network, a wireless local area network, or a public switched telephone network (PSTN).

The system 700 may also include a cloud computing architecture 712 that includes at least one group of computing devices 714. Although the illustrative example of FIG. 7 shows a single group of computing devices 714, the cloud computing architecture 712 may include multiple groups of computing devices. The group of computing devices 714 may host a number of instances of virtual machines to provide services to a customer of the service provider 704. The group of computing devices 714 may have similar configurations and/or similar workload conditions with respect to providing services to the customer of the service provider 704. Additionally, the group of computing devices 714 may have a usage of one or more computing resources over time that is similar. The group of computing devices 714 may send data indicating usage of one or more computing resources by the group of computing devices 714. In some cases, the cloud computing architecture 712 may be associated with an entity that is different from that of the service provider 704.

The computing device 702 may include one or more processors, such as processor 716. The one or more processors 716 may include at least one hardware processor, such as a microprocessor. In some cases, the one or more processors 716 may include a central processing unit (CPU), a graphics processing unit (GPU), or both a CPU and GPU, or other processing units. Additionally, the one or more processors 716 may include a local memory that may store program modules, program data, and/or one or more operating systems.

In addition, the computing device 702 may include one or more computer-readable storage media, such as computer-readable storage media 718. The computer-readable storage media 718 may include volatile and nonvolatile memory and/or removable and non-removable media implemented in any type of technology for storage of information, such as computer-readable instructions, data structures, program modules, or other data. Such computer-readable storage media 718 may include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, removable storage media, or any other medium that may be used to store the desired information and that may be accessed by a computing device. Depending on the configuration of the computing device 702, the computer-readable storage media 718 may be a type of tangible computer-readable storage media and may be a non-transitory storage media.

The computer-readable storage media 718 may be used to store any number of functional components that are executable by the one or more processors 716. In many implementations, these functional components comprise instructions or programs that are executable by the one or more processors 716 and that, when executed, implement operational logic for performing the operations attributed to the computing device 702. Functional components of the computing device 702 that may be executed on the one or more processors 716 for implementing the various functions and features related to detecting leakage of computing resources in cloud computing architectures, as described herein, include a data collection and organization module 720, a training module 722, a leak detection module 724, a corrective action module 726, and a data presentation module 728. One or more of the modules, 720, 722, 724, 726, 728 may be used to implement the resource leak detection system 128 of FIG. 1. In particular implementations, one or more of the modules 720, 722, 724, 726, 728 may be utilized to implement at least a portion of the example environment 100 of FIG. 1, at least a portion of the example environment 200 of FIG. 2, the framework 300, the process 400, the process 500, or combinations thereof.

The computing device 702 may also include, or is coupled to, a data store 730 that may include, but is not limited to, RAM, ROM, EEPROM, flash memory, one or more hard disks, solid state drives, optical memory (e.g. CD, DVD), or other non-transient memory technologies. The data store 730 may maintain information that is utilized by the computing device 702 to perform operations related to detecting leakage of computing resources in cloud computing architectures. For example, the data store 730 may store computing resource usage data 732. In addition, the data store 730 may store reference data 734.

The computing resource usage data 732 may include the data collected over time for the usage of computing resources by the group of computing devices 714. In some implementations, the computing resource usage data 732 may include values of usage of one or more computing resources by the computing devices included in the group of computing devices 714 and respective times that the values were obtained. In addition, the computing resource usage data 732 may indicate a configuration of the group of computing devices 714 when the values of usage of the one or more computing resources were obtained. The configuration of the computing devices of the group of computing devices 714 may indicate software components executed by the computing devices of the group of computing devices 714, services provided to a customer of the service provider 704 via the group of computing devices 714, one or more instances of virtual machines hosted by the group of computing devices 714 for a customer of the service provider 704, specifications provided by a customer of the service provider 704 for services provided via the group of computing devices 714 on behalf of the customer, or combinations thereof. In some scenarios, the computing resource usage data 732 may correspond to the usage of computing resources by service instances and/or cloud infrastructure components/agents executed by the group of computing devices 714.

The reference data 734 may include baseline data that may indicate usage of one or more computing resources by the computing devices of the group of computing devices 714. For example, the reference data 734 may include baseline patterns of the usage of computing resources by the group of computing devices 714. The reference data 734 may be calculated from the computing resource usage data 732. In some cases, the reference data 734 may indicate a typical usage of computing resources by the group of computing devices 714 for one or more configurations of the computing devices of the group of computing devices 714. In particular implementations, the reference data 734 may indicate baseline usage of computing resources by the group of computing devices 714 in association with providing services to a customer of the service provider 704. The reference data 734 may include average usage of one or more computing resources by the group of computing devices 714, median usage of the one or more computing resources by the group of computing devices 714, standard deviation of the usage of the one or more computing resources by the group of computing devices 714, distributions related to usage of the one or more computing resources by the group of computing devices 714, or combinations thereof.

The data collection and organization module 720 may include computer-readable instructions that are executable by the processor 716 to obtain data related to the usage of computing resources by the group of computing devices 714. The data collection and organization module 720 may also include computer-readable instructions that are executable by the processor 716 to organize the data related to the usage of computing resources by the group of computing devices 714. In particular implementations, the data collection and organization module 720 may perform operations related to the computing resource data aggregation and organization of 206 of FIG. 2 and/or the operations 332, 340 described with respect to the framework 300 of FIG. 3. For example, the data collection and organization module 720 may utilize one or more agents to monitor the usage of computing resources by group of computing devices 714 and to collect data indicating the usage of the computing resources. The data indicating usage of computing resources may be obtained from one or more software components executed by the group of computing devices 714 at regular time intervals, such as 0.5 seconds, 1 second, 5 seconds, 10 seconds, 30 seconds, 1 minute, 5 minutes, 10 minutes, 20 minutes, 30 minutes, 45 minutes, 60 minutes, or 90 minutes. The data obtained by the data collection and organization module 720 may relate to computing resource usage by one or more service instances and/or one or more cloud infrastructure components/agents executed by the group of computing devices 714.

In some cases, the data collection and organization module 720 may reduce the amount of data used to determine whether a computing resource leak is occurring. To illustrate, the data collection and organization module 720 may determine a maximum value of usage of a computing resource from among a plurality of values collected in a time interval. In an illustrative example, the data collection and organization module 720 may obtain 50 values in a 5-minute interval and identify a maximum value of usage of a computing resource from among the 50 values. In another illustrative example, the data collection and organization module 720 may identify an average value of usage of the computing resource or a median value of usage of the computing resource utilizing the 50 values.

The training module 722 may include computer-readable instructions that are executable by the processor 716 to produce the reference data 734. The training module 722 may also identify parameters that may be used to indicate that a leak of a computing resource may be taking place. In particular implementations, the training module 722 may analyze data obtained by the data collection and organization module 720 to determine an average value of usage of a computing resource, a median value of usage of the computing resource, a standard deviation of the usage of the computing resource, a distribution of the usage of the computing resource, or combinations thereof. In some cases, the distribution of the usage of the computing resource may include a Gaussian distribution. In an illustrative example, the training module 722 may determine the distribution of usage of the computing resource by determining a minimum value of usage of the computing resource over a time interval, a value of usage of the computing resource that is greater than 1% of the values of usage of the computing resource obtained over the time interval, a value of usage of the computing resource that is greater than 25% of the values of usage of the computing resource obtained over the time interval, a value of usage of the computing resource that is greater than 70% of the values of usage of the computing resource obtained over the time interval, a value of usage of the computing resource that is greater than 99% of the values of usage of the computing resource obtained over the time interval, and a maximum value of usage of the computing resource over the time interval.

Additionally, the training module 722 may update the reference data 734 and/or parameters used to identify computing resource leaks as new data is obtained by the data collection and organization module 720. Thus, the reference data 734, such as baseline computing resource usage patterns, and other parameters used to identify computing resource leaks may be continuously updated as new data indicated the usage of computing resources is obtained. For example, an average value of usage of a computing resource, a media value of usage of the computing resource, a standard deviation of usage of the computing resource, the distribution of usage of the computing resource, or combinations thereof, may be modified based at least partly on new values for usage of the computing resource. Furthermore, in some situations, the training module 722 may dispose of data that may have been obtained greater than a specified time interval before a current time. That is, values of usage of a computing resource that are older than a threshold age may be removed from consideration in determining one or more portions of the reference data 734. In some implementations, the training module 722 may utilize a partition incremental discretization method to reduce the amount of data utilized to obtain the reference data 734. In an illustrative example, the training module may utilize the following equation to reduce the data used to determine the reference data 734:

$$\mathrm{bin}_i = \begin{cases} \mathrm{bin}_i * \delta, & \text{new data is not located in } \mathrm{bin}_i \\ \mathrm{bin}_i * \delta + 1, & \text{otherwise} \end{cases},$$

where $\delta$ relates to an amount of time utilized to remove data from consideration in determining the reference data 734. By removing values of usage of a computing resource that are older than a threshold age, the training module 722 may minimize the computing resources and memory resources utilized by the computing device 702 to detect leaks of computing resources in cloud computing architectures.

The leak detection module 724 may include computer-readable instructions that are executable by the processor 716 to detect leakage of computing resources in cloud computing architectures. The leak detection module 724 may utilize current data from the computing resource usage data 732 that includes values of usage of a computing resource and also utilize the reference data 734 to determine candidate start times of a leak of a computing resource. In some cases, the leak detection module 724 may identify a candidate start time for a leak of a computing resource based at least partly on incremental increases of the values of usage of the computing resource over time. The leak detection module 724 may keep a candidate start time for a leak of a computing resource based at least partly on the usage of the computing resource continuing to increase until one or more criteria are satisfied indicating that a computing resource leak is taking place or until determining that a leak of a computing resource is not occurring.

For example, the leak detection module 724 may determine that a leak of a computing resource is occurring based at least partly on determining that values of usage of the computing resource have increased by a specified amount for a particular period of time. In particular implementations, the leak detection module 724 may determine a score to indicate a probability of a leak of a computing resource.

In some situations, as the score increases, the probability that a leak of the computing resource is taking place also increases. The leak detection module 724 may determine the score based at least partly on an amount of increase in the values of usage of the computing resource over time, a period of time that the values of the usage of the computing resource have been increasing, a number of values of usage of the computing resource collected over the period of time, or combinations thereof. The leak detection module 724 may determine that a leak of a computing resource has taken place based at least partly on the score corresponding to a predetermined threshold score.

Additionally, the leak detection module 724 may maintain a candidate start time for a leak of a computing resource until determining that a decrease in the value of the usage of the computing resource occurs or until determining an increase in the usage of the computing resource is less than a threshold amount. In these situations, the leak detection module 724 may determine a new candidate start time for the leak of the computing resource to a current time. In this way, the leak detection module 724 may incrementally reset the candidate start time for the leak of the computing resource until the values of usage of the computing resource begin to increase above a threshold amount.

The corrective action module 726 may include computer-readable instructions that are executable by the processor 716 to determine one or more actions that may reduce usage of a computing resource based at least partly on the leak detection module 724 determining that a leak of the computing resource is taking place. In some implementations, the corrective action module 726 may determine that a software update may reduce usage of a computing resource associated with a computing resource leak. In other implementations, the corrective action module 726 may determine that a restart of one or more computing devices included in a group of computing devices may reduce usage of the computing resource associated with a computing resource leak. Additionally, the corrective action module 726 may send one or more signals, one or more instructions, or both to one or more computing devices included in the group of computing devices 714 to implement operations to reduce usage of a computing resource associated with a computing resource leak.

The data presentation module 728 may include computer-readable instructions that are executable by the processor 716 to present data related to usage of computing resources. In some cases, the data presentation module 728 may provide one or more user interfaces that indicate usage of computing resources by one or more groups of computing devices included in a cloud computing architecture. The one or more user interfaces may indicate that a leak of a computing resource is occurring in one or more groups of computing devices included in the cloud computing architecture. The one or more user interfaces may include options that are selectable to provide increasing details as to the configurations of computing devices associated with computing resource leaks, usage of one or more computing resources by the computing devices associated with the computing resource leaks, or both. In particular implementations, the one or more user interfaces produced by the data presentation module 728 may be accessed by users associated with the service provider 704. Further, the one or more user interfaces produced by the data presentation module 728 may be accessed by the customer computing device 706.

Figure 8:
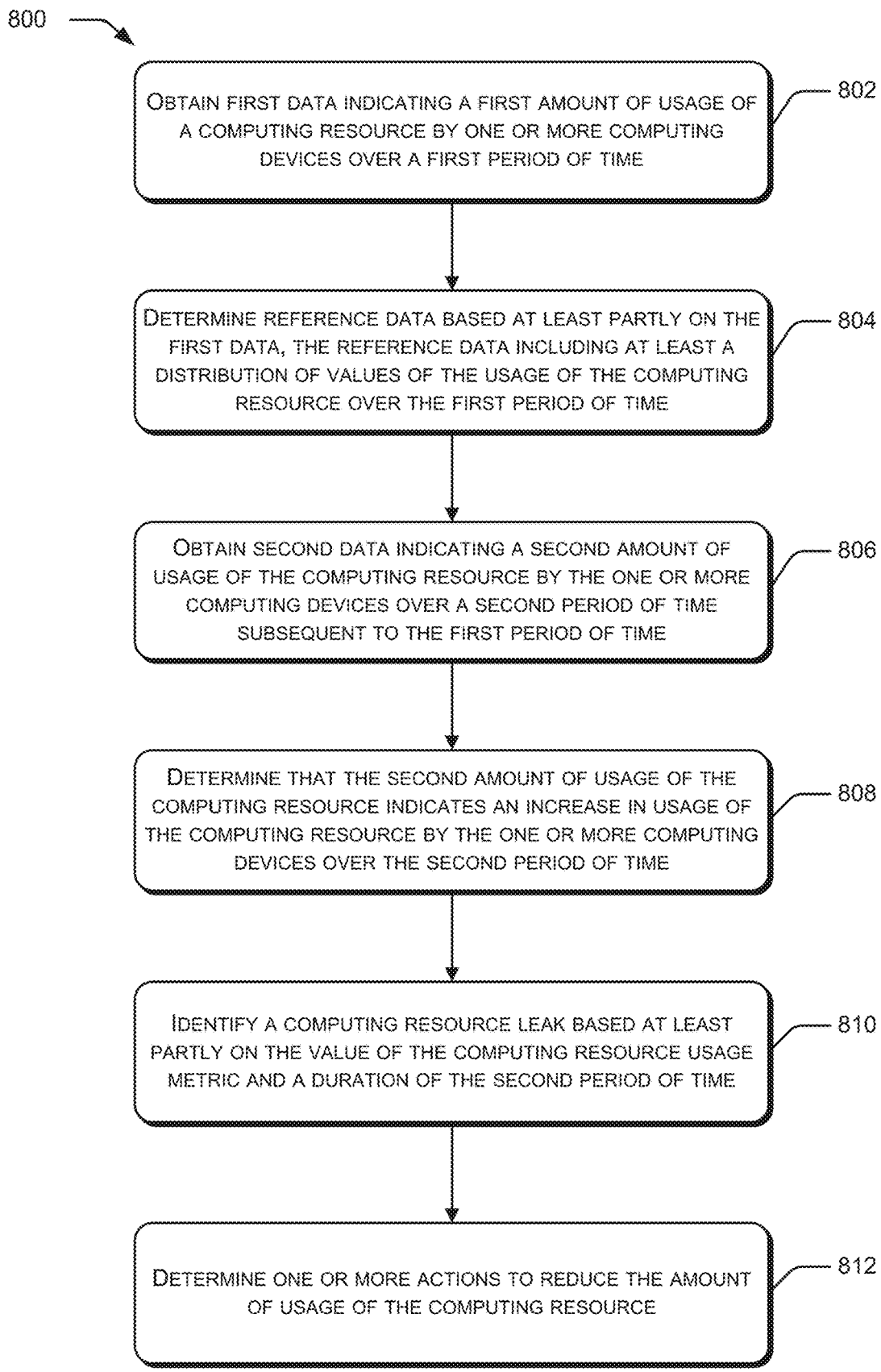
FIG. 8 is a flow diagram of a first example process to detect leakage of computing resources in cloud computing architectures.
Figure 9:
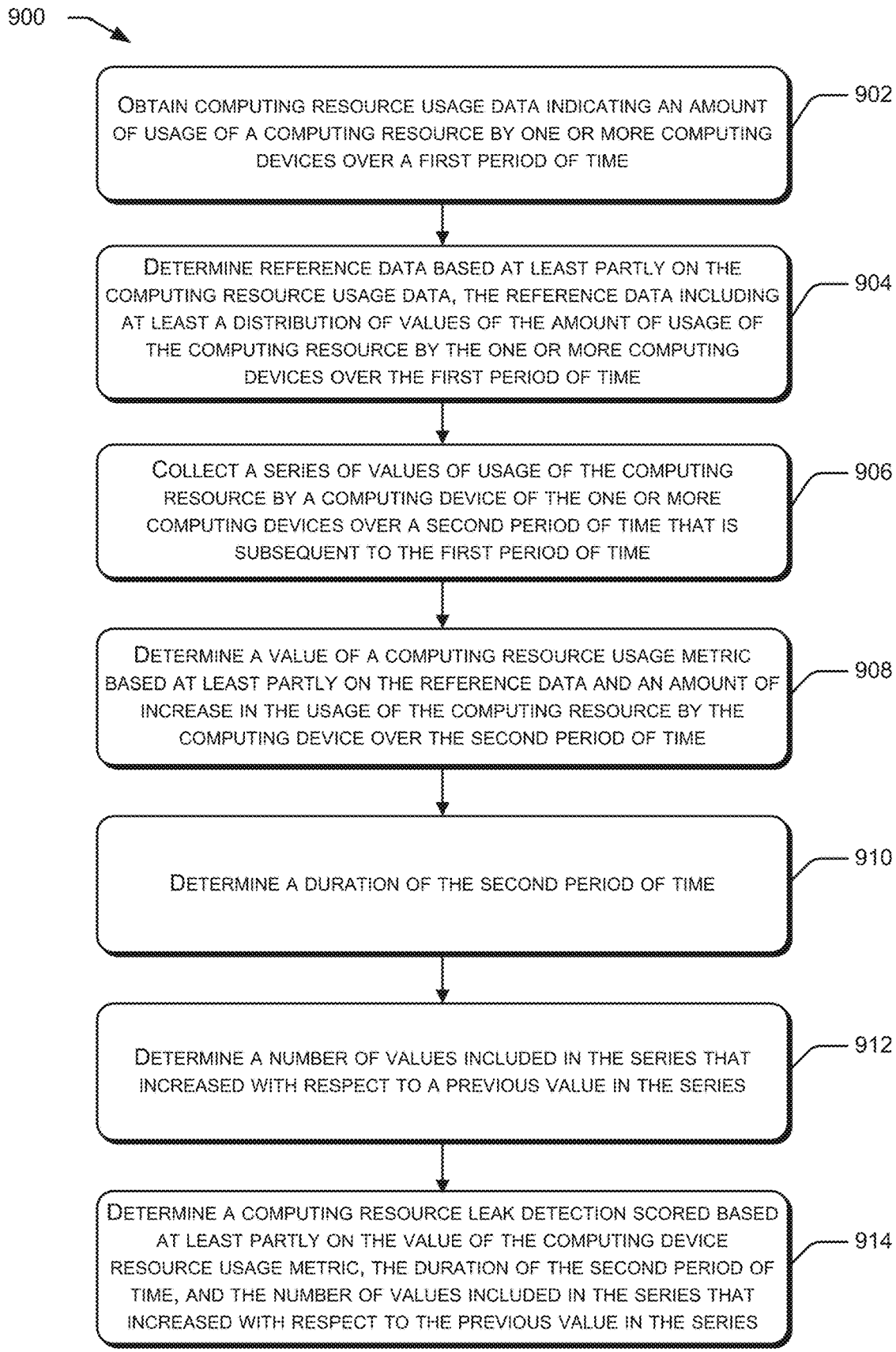
FIG. 9 is a flow diagram of a second example process to detect leakage of computing resources in cloud computing architectures.

In the flow diagrams of FIGS. 8 and 9, each block represents one or more operations that may be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations may be combined in any order and/or in parallel to implement the processes. For discussion purposes, the processes 800 and 900 may be described with reference to FIG. 1, 2, 3, 4, 5, 6, or 7 as described above, although other models, frameworks, systems and environments may implement these processes.

FIG. 8 is a flow diagram of a first example process 800 to detect leakage of computing resources in cloud computing architectures. At 802, the process 800 includes obtaining first data indicating a first amount of usage of a computing resource by one or more computing devices over a first period of time. The one or more computing devices may be included in at least a portion of a cloud computing architecture that host one or more instances of a virtual machine to provide services for a customer of a service provider. In some cases, the values of usage of the computing resource may be obtained periodically, such as at a particular time interval. Additionally, the first data may include values of usage of the computing resource that are selected from among a plurality of values of usage of the computing resource by the one or more computing devices. In illustrative examples, a maximum value, a median value, or an average value may be obtained from among a plurality of values of the usage of the computing device over a period of time.

In some implementations, the first data may include computing resource usage data from multiple computing devices that are grouped based on similarities between the computing resource usage data of the multiple computing devices. For example, a comparison may be performed with respect to data indicating usage of the computing resource by a first computing device over a period of time and additional data indicating usage of the computing resource by a second computing device over the period of time. A similarity metric may be determined based at least partly on the comparison. In situations where the similarity metric is above a threshold, the computing resource usage data from the first computing device and the computing resource usage data from the second computing device may be grouped together when determining reference data and/or when determining whether a leak is occurring with respect to the usage of computing resources by the first computing device and the second computing device.

At 804, the process 800 includes determining reference data based at least partly on the first data. The reference data may include at least a distribution of values of the usage of the computing resource over the first period of time. The reference data may also include a median value for usage of the computing resource by the one or more computing devices, an average value for usage of the computing resource by the one or more computing devices, a standard deviation for usage of the computing resource by the one or more computing devices, or a combination thereof. In some cases, the reference data may be updated as new computing resource usage data is obtained from the one or more computing devices. Additionally, some of the computing resource usage data previously used to determine the reference data may be discarded as new computing resource usage data is obtained from the one or more computing resources. For example, computing resource usage data that was obtained more than a threshold period of time from a current time may be removed from a dataset used to produce the reference data.

At 806, the process 800 includes obtaining second data indicating a second amount of usage of the computing resource by the one or more computing devices over a second period of time subsequent to the first period of time. The second data may include new computing resource usage data obtained from the one or more computing devices after the reference data was produced using the first data. The second period of time may include a start time, an end time and one or more intermediate times between the start time and the end time. In some cases, the start time, one or more of the intermediate times, or both may be considered candidate start times for a leak of the computing resource. Additionally, in some cases, computing resource usage data obtained from the one or more computing resources between the first period of time and the second period of time may include one or more candidate start times for a computing resource leak. The candidate start times for a leak of computing resources may be modified to subsequent times when usage of computing resources by the one or more computing devices decreases after determining an initial candidate start time or when usage of computing resources by the one or more computing devices increases by less than a threshold amount over a period of time.

At 808 the process 800 includes determining a value of a computing resource usage metric based at least partly on an amount of the increase in the usage of the computing resource over the second period of time and the reference data. In an illustrative example, the computing resource usage metric may correspond with the term $\Delta V$ defined previously.

In some cases, the computing resource usage metric may be used to identify candidate start times for a computing resource leak. For example, in situations where the computing resource usage metric is above a threshold value for a period of time, a start time associated with the period of time may be considered a candidate start time for a computing resource leak. In other cases, the usage of the computing resource may decrease or increase less than a threshold amount. In these scenarios, the computing resource usage metric for an additional period of time may have a value that is less than one or more threshold values. Continuing with this example, a start time associated with the additional period of time may not be considered as a candidate start time for a computing resource leak and, in some instances, an end time of the additional period of time may be considered as a candidate start time for a leak of a computing resource pending an analysis of new computing resource usage data obtained from the one or more computing devices.

At 810, the process 800 includes determining that a computing resource leak is occurring based at least partly on the value of the computing resource usage metric and a duration of the second period of time. In particular implementations, a computing resource leak may be occurring based at least partly on the value of the computing resource usage metric being above a threshold value and the duration of the second period of time being longer than a threshold period of time. In some cases, one or more user interfaces may be produced to show information related to computing resource leaks. For example, a user interface may be produced that indicates the computing resource leak is occurring with respect to one or more software components being executed by the one or more computing devices. The one or more software components may include service instances executed by virtual machines to provide services to customers of a service provider and/or a set of instances of cloud infrastructure components/agents. To illustrate, the user interface may indicate that a computing resource leak is occurring with respect to a load balancing software component executing on the one or more computing devices or that a computing resource leak is occurring with respect to a monitoring software component executing on the one or more computing devices. Additionally, one or more user interfaces may indicate that a computing resource leak is occurring with respect to one or more configurations of the one or more computing devices. In an illustrative example, the one or more user interfaces may indicate computing resource usage by the one or more computing devices in a first configuration associated with a testing phase of software provided by a customer of a service provider and computing resource usage by the one or more computing devices in a second configuration associated with a production phase of implementing the software of the customer of the service provider.

At 812, the process 800 includes determining one or more actions to reduce the amount of usage of the computing resource based at least partly on the computing resource leak occurring. For example, the one or more actions may include restarting the one or more computing devices. In another example, the one or more actions may include updating software being executed by the one or more computing devices because some computing resource leaks may be caused by software defects. In some cases, the defective software may be provided by a customer of a service provider, where the service provider is using a cloud computing architecture that includes the one or more computing devices to provide services to the customer related to the software.

FIG. 9 is a flowchart of a second example process 900 to detect leakage of computing resources in cloud computing architectures. At 902, the process 900 includes obtaining computing resource usage data indicating an amount of usage of a computing resource by one or more computing devices over a first period of time. At 904, the process 900 includes determining reference data based at least partly on the computing resource usage data. The reference data may include at least a distribution of values of the amount of usage of the computing resource by the one or more computing devices over the first period of time. In some cases, the reference data may be updated based at least partly on the computing resource usage data that is obtained after obtaining the computing resource usage data over the first period of time.

At 906, the process 900 includes collecting a series of values of usage of the computing resource by a computing device of the one or more computing devices over a second period of time that is subsequent to the first period of time. In some implementations, each value in the series of values may be collected at a predetermined time interval. Additionally, each pair of values included in the series may be compared with each other to determine that the usage of the computing resource is increasing as the series progresses, that the usage of the computing resource is decreasing as the series progresses, or that the usage of the computing resource is decreasing with respect to some sections of the series and increasing with respect to other sections of the series.

At 908, the process 900 includes determining a value of a computing resource usage metric based at least partly on an amount of increase in the usage of the computing resource by the computing device over a second period of time and the reference data. The value of the computing resource usage metric may depend on factors in addition to the increase in usage of the computing resource and the reference data. For example, at 910, the process 900 includes determining a duration of the second period of time and at 912, the process 900 includes determining a number of values included in the series that increased with respect to a previous value in the series. In determining values included in the series that increased with respect to a previous value in the series, pairs of values are analyzed. To illustrate, a first value in the time series may be collected at a time, t, a second value in the time series may be collected at a time, t+1, and a third value in the time series may be collected at a time, t+2. Continuing with this illustration, a difference between the third value and the second value may be determined and a difference between the second value and the first value may be determined. A value in the time series may be determined to be increasing when the difference between the value and the preceding value is a positive number. In an illustrative scenario, the third value may be determined to be an increasing value in the series based on a determination that the difference between the third value and the second value is a positive number.

At 914, the process 900 includes determining a computing resource leak detection score based at least partly on the value of the computing resource usage metric, the duration of the second period of time, and the number of values included in the series that increased with respect to the previous value in the series. In some cases, the value of the computing resource usage metric may be associated with a first weight, the duration of the second period of time may be associated with a second weight, and the number of values included in the series that increased with respect to the previous value in the series may be associated with a third weight. In particular implementations, the computing resource leak detection score may be further based at least partly on the first weight, the second weight, and the third weight.

Additionally, determining the computing resource leak detection score may include determining that the value of the computing resource usage metric is greater than a first threshold; determining that the duration of the second period of time is greater than a second threshold; and determining that the number of values included in the series that increased with respect to the previous value in the series is greater than a third threshold. In some implementations, the first threshold, the second threshold, and the third threshold may be set such that the conditions associated with determining the computing resource leak detection score exceed the thresholds when a computing resource leak is occurring that may disrupt services provided to one or more customers of a service provider. The leak detection score may indicate a probability that a leak of the computing resource is occurring with respect to the one or more computing devices based at least partly on the computing resource leak detection score. Based at least partly on the resource leak detection score being above a threshold, one or more actions may be determined to reduce the usage of the computing resource by the one or more computing devices.

Figure 10:
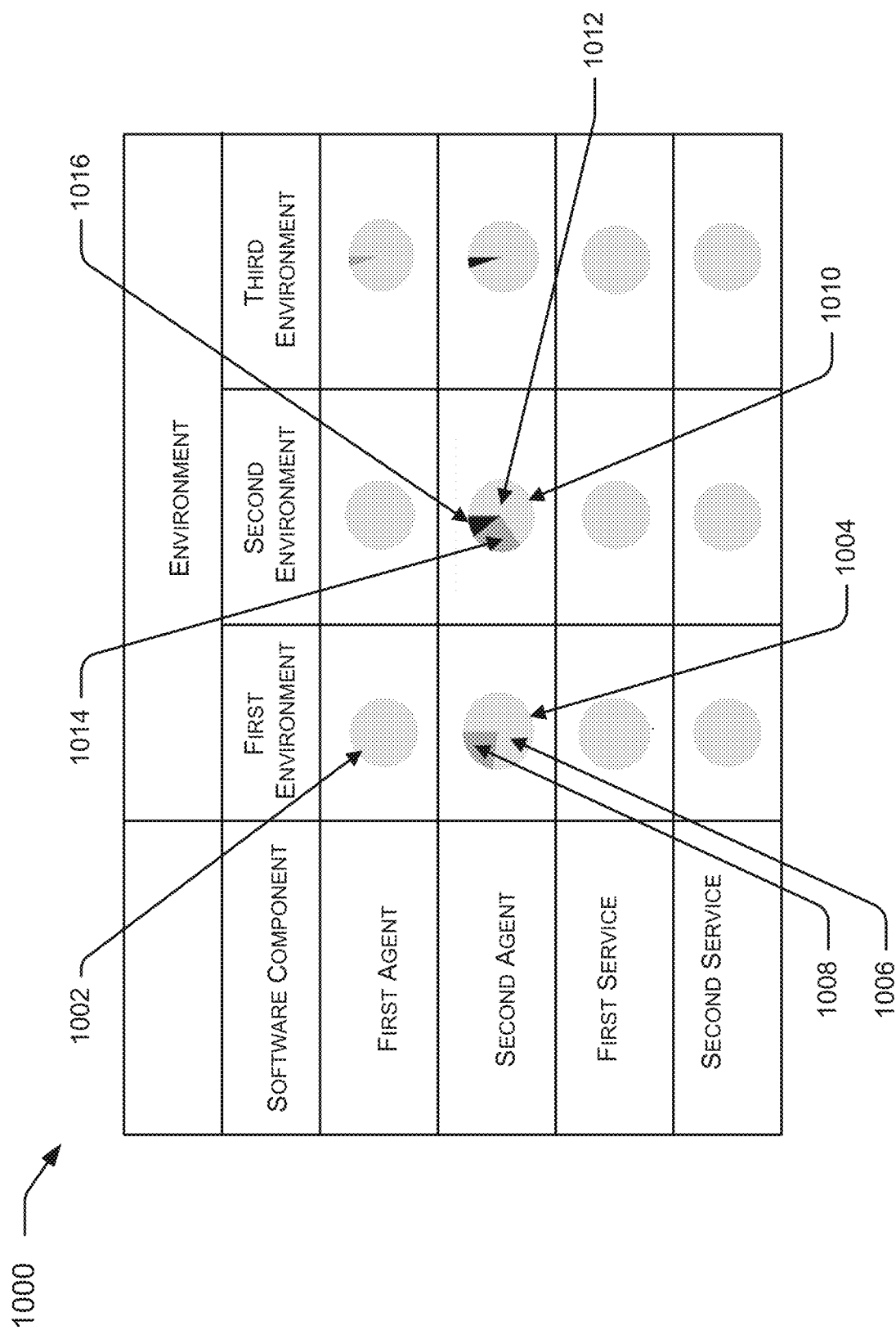
FIG. 10 is a first example user interface indicating usage of computing resources by software components executed in cloud computing architectures.

FIG. 10 illustrates a first example user interface 1000 indicating usage of computing resources by software components executed in cloud computing architectures. In particular, the user interface 1000 indicates usage of computing resources by a number of different software components executed by computing devices included in a cloud computing architecture. In various implementations, the computing resource usage indicated by the user interface 1000 may correspond to a particular group or cluster of computing devices included in a cloud computing architecture. The software components may include service instances implemented by virtual machines to provide services to customers of a service provider associated with the cloud computing architecture. The software components may also include instances of cloud infrastructure components/agents. In the illustrative example of FIG. 10, the software components include a first agent, a second agent, a first service, and a second service. Additionally, the computing resources being utilized by the software components may include memory allocation, network resource usage, processor cycles, combinations thereof, and the like. Further, the user interface 1000 indicates computing resource usage by the software components in different environments. The different environments may be related to the services being provided by the computing devices, configurations of the computing devices (e.g., hardware configurations, software configurations), or both. In the illustrative example of FIG. 10, the user interface 1000 indicates computing resource usage in a first environment, a second environment, and a third environment.

The computing resource usage by the software components may be indicated by pie charts, such as an example pie chart 1002. The shading of the pie chart may indicate situations where a computing resource leak may be occurring and situations where a computing resource leak may not be occurring. In situations where a leak of computing resources is detected, the instance or instances of the software components that are causing the computing resource leak may be identified as being associated with the computing resource leak. In particular implementations, the shading of the pie charts may indicate a probability that a computing resource leak is occurring with respect a group of computing device included in a cloud computing architecture. In some cases, the shading of the pie charts may change to reflect a probability that one or more computing devices of a group of computing devices may be experiencing a computer resource leak. For example, a first pie chart 1004 may include a first portion 1006 and a second portion 1008. In the illustrative example of FIG. 10, the first portion 1006 may indicate an amount of computing devices, such as a percentage of total computing device, included in a group of computing devices that are not associated with a leak of computing resources. To illustrate, patterns of computing resource usage by the computing devices represented by the first portion 1006 may be within a threshold of baseline patterns of computing resource usage for the group of computing devices. Additionally, in the illustrative example of FIG. 10, the second portion 1008 may indicate an amount of additional computing devices included in a group of computing devices that may be associated with a leak of computing resources. With respect to the additional computing devices associated with the second portion 1008, the patterns of computing resource usage by the additional computing devices may be outside of a threshold of baseline patterns of computing resource usage for the group of computing devices. In this way, the user interface 1000 may indicate a number of computing devices that may be associated with a leak of computing device resources and that the operation of the computing devices may need to be investigated or modified to reduce the usage of computing resources.

The user interface 1000 also includes a second pie chart 1010 that indicates different degrees of computing resource leakage in a number of computing devices included in a group of computing devices associated with a cloud computing architecture. The leakage of computing resources indicated by the second pie chart 1010 may be occurring with respect to the second agent in the second environment. For example, the second pie chart 1010 includes a first portion 1012, a second portion 1014, and a third portion 1016. The first portion 1012 may represent a number of computing devices that are not associated with a leak of computing resources. The second portion 1014 and the third portion 1016 may represent a number of computing devices that may be associated with a leak of computing resources. The second portion 1014 and the third portion 1016 may indicate amounts of computing devices that meet or exceed different thresholds of probability that a leak of computing resources may be occurring. To illustrate, the second portion 1014 may represent a first number of computing device associated with a first probability that a leak of computing resources may be taking place and the second portion 1016 may represent a second number of computing devices associated with a second probability, different from the first probability, that a leak of computing resources may be taking place.

In various implementations, an input device may be utilized to select a pie chart or a portion of a pie chart included in the user interface 1000. For example, a mouse device may be used to click on a pie chart or a portion of a pie chart, a finger or stylus may be used to touch a pie chart or a portion of a pie chart, or an input device may hover over a pie chart or a portion of a pie chart. In response to selection of a pie chart or a portion of a pie chart, additional information may be provided about computing devices associated with the selected pie chart or portion of the pie chart. In an illustrative example, selection of the second portion 1008 of the first pie chart 1004 may cause an additional user interface to be displayed that includes information associated with the computing devices corresponding to the second portion 1008. In some cases, an additional user interface may be displayed within the user interface 1000 including information such as, one or more identifiers of groups of computing devices, a number of computing devices within the one or more groups that may be associated with a leak of computing resources, a number of computing devices within the one or more groups that may not be associated with a leak of computing resources, a configuration of the computing devices included in the one or more groups, one or more software components of the computing devices included in the one or more groups that may be associated with a leak of computing devices, or combinations thereof.

Figure 11:
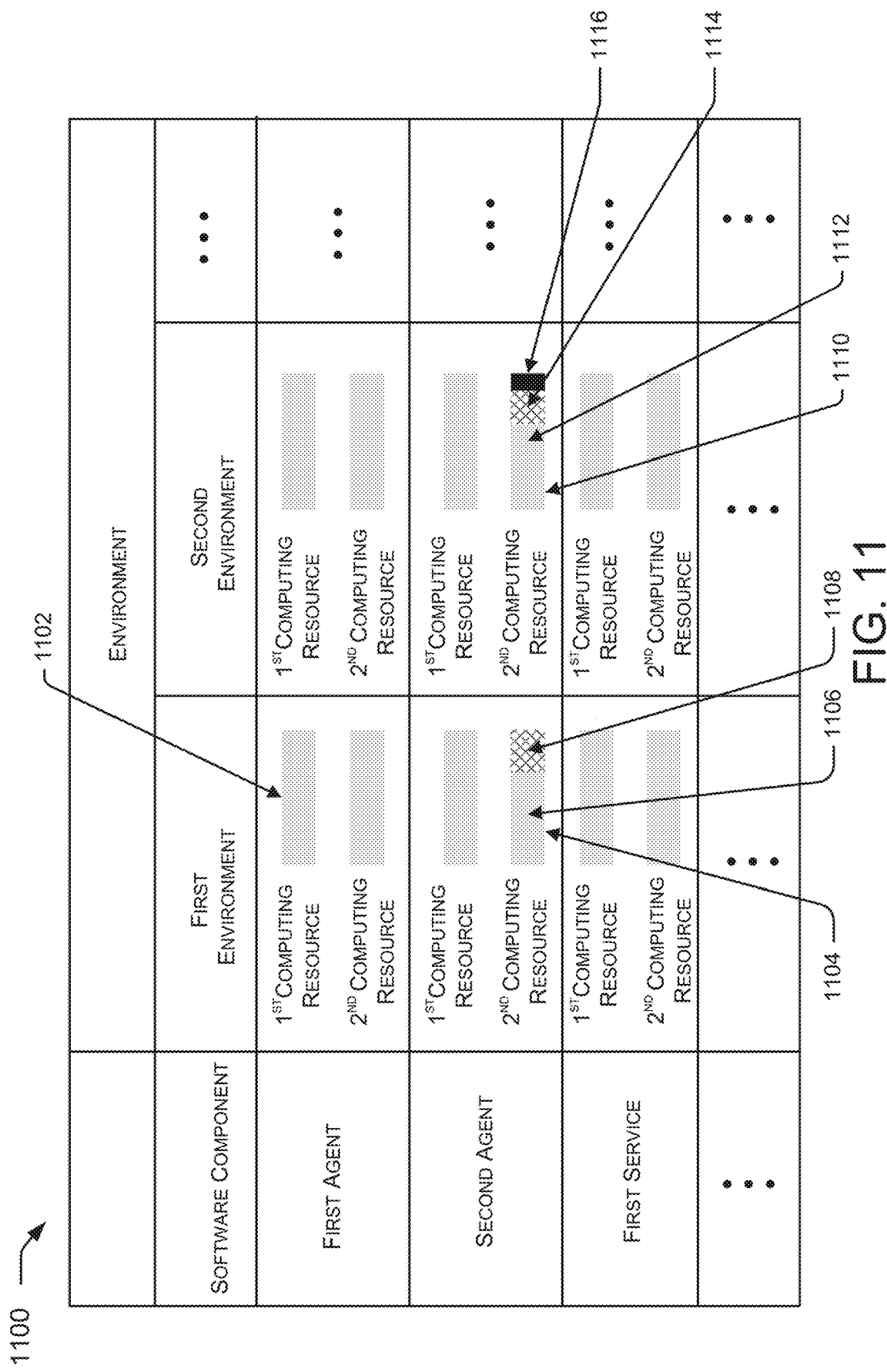
FIG. 11 is a second example user interface indicating usage of computing resources by software components executed in cloud computing architectures.

FIG. 11 illustrates a second example user interface 1100 indicating usage of computing resources by software components executed in cloud computing architectures. In some cases, the user interface 1100 may be displayed based on a selection of a user interface feature of user interface 1000 of FIG. 10. The user interface 1100 indicates usage of particular computing resources by specified software components executed by computing devices in a cloud computing architecture and in certain environments. In the illustrative example of FIG. 11, the user interface 1100 indicates usage of computing resources related to a first agent, a second agent, and a first service associated with a first environment and a second environment. Additionally, the user interface 1100 indicates a first computing resource and a second computing resources utilized by respective software components operating on computing devices of a cloud computing architecture. The software components may include service instances implemented by virtual machines to provide services to customers of a service provider associated with the cloud computing architecture. The software components may also include instances of cloud infrastructure components/agents. The first computing resource and the second computing resource may include memory allocation, network resource usage, processor cycles, combinations thereof, and the like. The first environment and the second environment may be related to the services being provided by the computing devices, configurations of the computing devices (e.g., hardware configurations, software configurations), or both.

The computing resource usage by the software components may be indicated by bar graphs, such as an example bar graph 1102 associated with usage of the first computing resource by the first agent in the first environment. The shading of the bar graph may indicate situations where a computing resource leak may be occurring and situations where a computing resource leak may not be occurring. In particular implementations, the shading of the bar graphs may indicate a probability that a computing resource leak is occurring for a particular computing resource with respect a group of computing device included in a cloud computing architectured. In some cases, the shading of the bar graphs may change to reflect a probability that one or more computing devices of a group of computing devices may be experiencing a computer resource leak in relation to a particular computing resource. For example, a first bar graph 1104 may include a first portion 1106 and a second portion 1108. In the illustrative example of FIG. 11, the first portion 1106 may indicate an amount of computing devices, such as a percentage of total computing device, included in a group of computing devices that are not associated with a leak of computing resources in relation to the usage of the second computing resource by the second agent in the first environment. To illustrate, patterns of usage of the second computing resource by the computing devices represented by the first portion 1106 may be within a threshold of baseline patterns of usage of the second computing resource for the group of computing devices. Additionally, in the illustrative example of FIG. 11, the second portion 1108 may indicate an amount of additional computing devices included in a group of computing devices that may be associated with a leak of the second computing resource. With respect to the additional computing devices associated with the second portion 1108, the patterns of usage of the second computing resource by the additional computing devices may be outside of a threshold of baseline patterns of usage of the second computing resource for the group of computing devices. In this way, the user interface 1100 may indicate a number of computing devices that may be associated with a leak of the second computing resource and that the operation of the computing devices may need to be investigated or modified to reduce the usage of second computing resource.

The user interface 1100 also includes a second bar graph 1110 that indicates different degrees of leakage of the second computing resource in a number of computing devices included in a group of computing devices associated with a cloud computing architecture. The leakage of the second computing resource indicated by the second bar graph 1110 may be occurring with respect to the second agent in the second environment. For example, the second pie chart 1110 includes a first portion 1112, a second portion 1114, and a third portion 1116. The first portion 1112 may represent a number of computing devices that are not associated with a leak of the second computing resource. The second portion 1114 and the third portion 1116 may represent a number of computing devices that may be associated with a leak of the second computing resource. The second portion 1114 and the third portion 1116 may indicate amounts of computing devices that meet or exceed different thresholds of probability that a leak of the second computing resource may be occurring. To illustrate, the second portion 1114 may represent a first number of computing device associated with a first probability that a leak of the second computing resource may be taking place and the second portion 1116 may represent a second number of computing devices associated with a second probability, different from the first probability, that a leak of the second computing resource may be taking place.

In various implementations, an input device may be utilized to select a bar graph or a portion of a bar graph included in the user interface 1100. For example, a mouse device may be used to click on a bar graph or a portion of a bar graph, a finger or stylus may be used to touch a bar graph or a portion of a bar graph, or an input device may hover over a bar graph or a portion of a bar graph. In response to selection of a bar graph or a portion of a bar graph, additional information may be provided about computing devices associated with the selected bar graph or portion of the bar graph. In an illustrative example, selection of the second portion 1108 of the first bar graph 1104 may cause an additional user interface to be displayed that includes information associated with the computing devices corresponding to the second portion 1108. In some cases, an additional user interface may be displayed within the user interface 1100 including information such as, one or more identifiers of groups of computing devices, a number of computing devices within the one or more groups that may be associated with a leak of computing resources, a number of computing devices within the one or more groups that may not be associate with a leak of computing resources, a configuration of the computing devices included in the one or more groups, one or more software components of the computing devices included in the one or more groups that may be associated with a leak of computing devices, or combinations thereof.

Figure 12:
FIG. 12 is a third example user interface indicating usage of computing resources by software components executed in cloud computing architectures.

FIG. 12 illustrates a third example user interface 1200 indicating usage of computing resources by software components executed in cloud computing architectures. In some implementations, the user interface 1200 may be displayed based on selection of a user interface feature of FIG. 10 or a user interface feature of FIG. 11. In particular implementations, the user interface 1200 may include information regarding groups or clusters of computing devices that may be associated with a leak of a computing resource. For example, the user interface 1200 includes a column "Computing Device Group Identifier" that includes identifiers of groups of computing devices that may be associated with a leak of a computing resource. The identifiers may be unique identifiers assigned to particular groups of computing devices. In some situations, the groups of computing devices may be associated with a particular configuration, a particular service, or both.

Additionally, the user interface 1200 includes a column "Computing Resource" that indicates a particular computing resource that may be associated with a leak. In the illustrative example of FIG. 11, the user interface 1100 includes information regarding groups of computing devices that may be associated with a leak of a first computing resource. The user interface 1200 also includes a column "Worst Computing Device Identifier" that indicates an identifier of a computing device included in each respective group that is utilizing the computing resource in according to a pattern that deviates the most from a baseline usage pattern of the computing resource. The user interface 1200 includes columns "Begin Leak Value" and "Begin Leak Time". The "Begin Leak Value" column indicates a value of usage of the first computing resource at a possible start time for a leak of the first computing resource. The "Begin Leak Time" column includes a date and/or a time (not shown) that a leak of the first computing resource began or may have begun (i.e., the probability that a computing resource leak is occurring may be below a particular threshold, but above one or more additional thresholds).

Further, the user interface 1200 includes a "Last Point Value" column and a "Last Point Time" column. The "Last Point Value" column includes a value of usage of the first computing resource at a most recent time that values of usage of the first computing resource are collected. The most recent time that values of usage of the first computing resource are collected is included in the "Last Point Time" column. The user interface 1200 may also include other information, such as a number of computing devices in a particular group of computing devices that may be associated with a leak of the first computing resource, a number of computing devices in a particular group of computing devices that may not be associated with a leak of the second computing resource, a ranking of the computing resource with respect to other computing resources in regard to a number of computing devices that may be associated with a leak of the computing resource, a score to indicate the probability that a leak of the computing resource is occurring, or combinations thereof. In some scenarios, additional user interfaces may be accessible from one or more of the user interface 1000, the user interface 1100, or the user interface 1200. For example, a user interface including information about particular computing devices that may be associated with a leak of a computing resource may be generated, such as a user interface including an identifier of the particular computing devices, an identifier of a group of computing devices that the particular computing devices is a part of, a computing resources associated with a leak or possible leak, values of usage of the computing resources, time that a leak or possible leak began, or combinations thereof.

Figure 13:
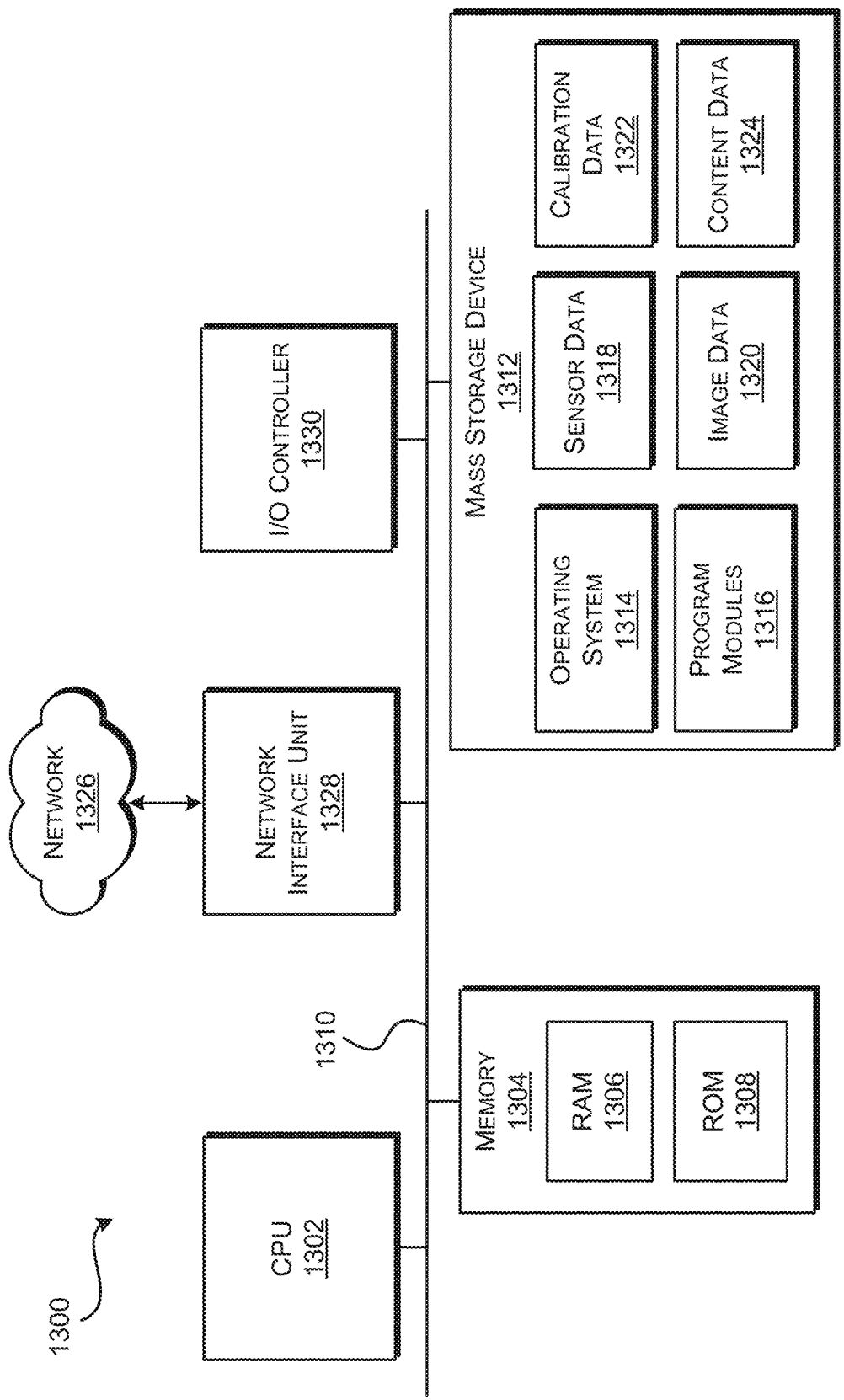
FIG. 13 is a schematic diagram illustrating an example distributed computing environment capable of implementing aspects of detecting leakage of computing resources in cloud computing architectures.

FIG. 13 shows additional details of an example computer architecture 1300 for a computer, such as computing devices 106, 108, 110, computing device 702, customer computing device 706, and/or customer user computing device 708, capable of executing the program components described above for utilizing computer-implemented agents to communicate information to individuals. Thus, the computer architecture 1300 illustrated in FIG. 13 illustrates an architecture for a server computer, mobile phone, a PDA, a smart phone, a desktop computer, a netbook computer, a tablet computer, a laptop computer, and/or a wearable computer. The computer architecture 1300 is an example architecture that may be used to execute, in whole or in part, aspects of the software components presented herein.

The computer architecture 1300 illustrated in FIG. 13 includes a central processing unit 1302 ("CPU"), a system memory 1304, including a random access memory 1306 ("RAM") and a read-only memory ("ROM") 1308, and a system bus 1310 that couples the memory 1304 to the CPU 1302. A basic input/output system ("BIOS") containing the basic routines that help to transfer information between elements within the computer architecture 1300, such as during startup, is stored in the ROM 1308. The computer architecture 1300 further includes a mass storage device 1312 for storing an operating system 1314, programs, module(s) 1316 (e.g., the resource leak detection system 128 of FIG. 1 and FIG. 2 and modules 720, 722, 724, 726, 728 of FIG. 7). Additionally, and/or alternatively, the mass storage device 1312 may store sensor data 1318, image data 1320 (e.g., photographs, computer generated images, object information about real and/or virtual objects in a scene, metadata about any of the foregoing, etc.), calibration data 1322, content data 1324 (e.g., computer generated images, videos, scenes, etc.), and the like, as described herein.

The mass storage device 1312 is connected to the CPU 1302 through a mass storage controller (not shown) connected to the bus 1310. The mass storage device 1312 and its associated computer-readable media provide non-volatile storage for the computer architecture 1300. Mass storage device 1312, memory 1304, and computer-readable storage media 718 are examples of computer-readable media according to this disclosure. Although the description of computer-readable media contained herein refers to a mass storage device, such as a solid state drive, a hard disk or CD-ROM drive, it should be appreciated by those skilled in the art that computer-readable media may be any available computer storage media or communication media that may be accessed by the computer architecture 1300.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of communication media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, erasable programmable read-only memory ("EPROM"), electrically erasable programmable read-only memory ("EEPROM"), flash memory or other solid state memory technology, compact disc read-only memory ("CD-ROM"), digital versatile disks ("DVD"), high definition/density digital versatile/video disc ("HD-DVD"), BLU-RAY disc, or other optical storage, magnetic cassettes, magnetic tape, magnetic disk storage or other magnetic storage devices, or any other medium which may be used to store the desired information and which may be accessed by the computer architecture 1300. For purposes of the claims, the phrase "computer storage medium," "computer-readable storage medium," and variations thereof, does not include communication media.

According to various configurations, the computer architecture 1300 may operate in a networked environment using logical connections to remote computers through the network 1326 and/or another network (not shown). The computer architecture 1300 may connect to the network 1326 through a network interface unit 1328 connected to the bus 1310. It should be appreciated that the network interface unit 1328 also may be utilized to connect to other types of networks and remote computer systems. The computer architecture 1300 also may include an input/output controller 1330 for receiving and processing input from input device(s) or input interface(s), and to provide output to an output device or output interface.

It should be appreciated that the software components described herein may, when loaded into the CPU 1302 and executed, transform the CPU 1302 and the overall computer architecture 1300 from a general-purpose computing system into a special-purpose computing system customized to facilitate the functionality presented herein. The CPU 1302 may be constructed from any number of transistors or other discrete circuit elements, which may individually or collectively assume any number of states. More specifically, the CPU 1302 may operate as a finite-state machine, in response to executable instructions contained within the software modules described herein. These computer-executable instructions may transform the CPU 1302 by specifying how the CPU 1302 transitions between states, thereby transforming the transistors or other discrete hardware elements constituting the CPU 1302. In some examples, processor(s) 716 may correspond to CPU 1302.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software described herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media described herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1300 in order to store and execute the software components presented herein. It also should be appreciated that the computer architecture 1300 may include other types of computing entities, including hand-held computers, embedded computer systems, personal digital assistants, and other types of computing entities known to those skilled in the art. It is also contemplated that the computer architecture 1300 may not include all of the components shown in FIG. 13, may include other components that are not explicitly shown in FIG. 13, or may utilize an architecture completely different than that shown in FIG. 13.

Figure 14:
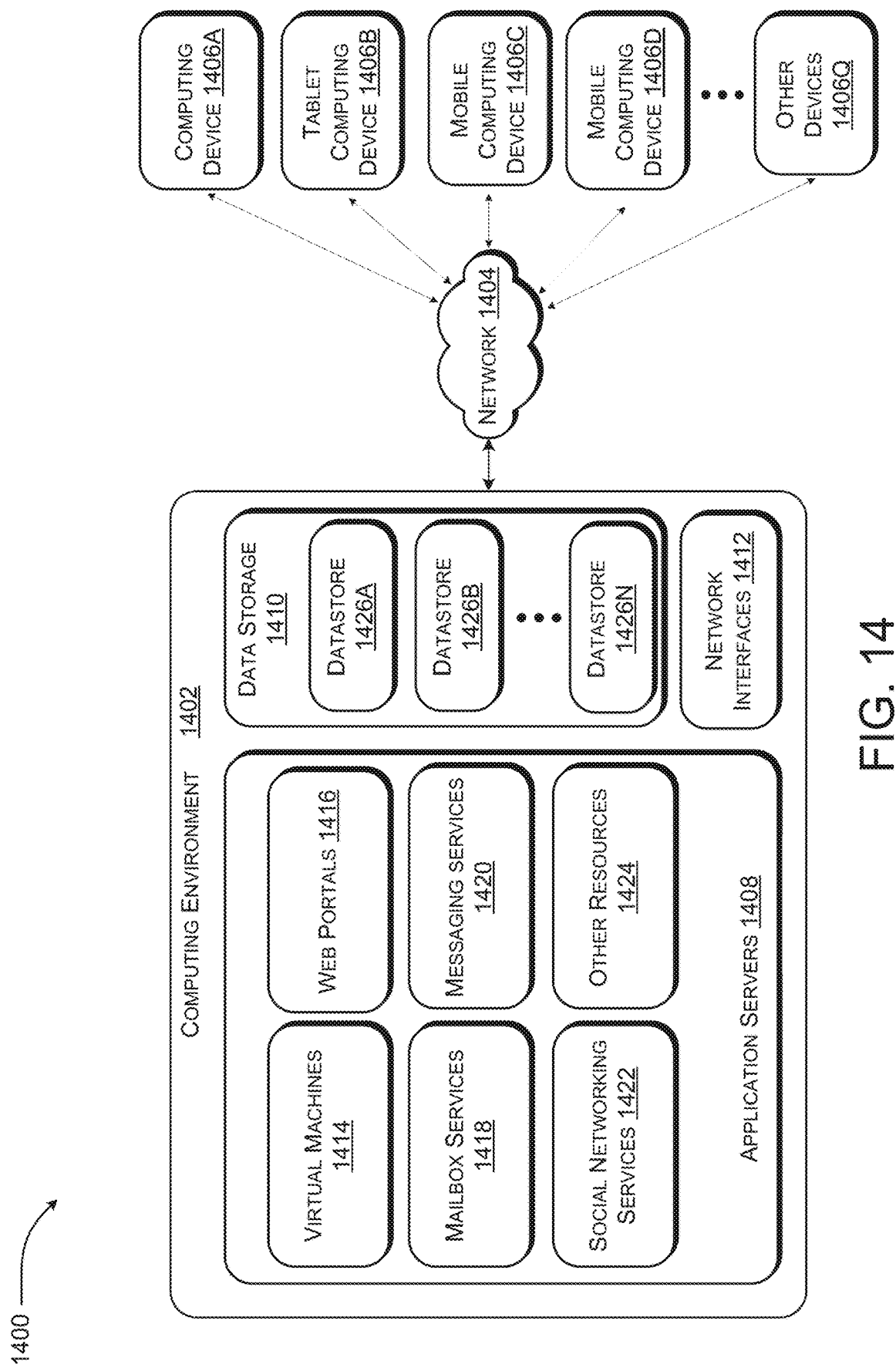
FIG. 14 depicts an example distributed computing environment capable of executing the software components described herein for implementing the detection of leaks of computing resources in cloud computing architectures.

FIG. 14 depicts an example distributed computing environment 1400 capable of executing the software components described herein for implementing the detection of leaks of computing resources in cloud computing architectures. Thus, the distributed computing environment 1400 illustrated in FIG. 14 may be utilized to execute any aspects of the software components presented herein to achieve aspects of the techniques described herein.

According to various implementations, the distributed computing environment 1400 includes a computing environment 1402 operating on, in communication with, or as part of a network 1404. In at least one example, at least some of computing environment 1400 may correspond to the leak detection system 128 of FIG. 1 and FIG. 2 and/or the computing device 702 of FIG. 7. The network 1404 may be or may include network(s) 710 described above with reference to FIG. 7. The network 1404 also may include various access networks. One or more client devices 1406A-1406Q (hereinafter referred to collectively and/or generically as "clients 1406") may communicate with the computing environment 1402 via the network 1404 and/or other connections (not illustrated in FIG. 14). By way of example, customer computing device 706 and customer user computing device 708 of FIG. 7 may correspond to one or more of client devices 1406A-1406Q (collectively referred to as "clients 1406"), where Q may be any integer greater than or equal to 1 depending on the desired architecture. In one illustrated configuration, the clients 1406 include a computing device 1406A such as a laptop computer, a desktop computer, or other computing device, a slate or tablet computing device ("tablet computing device") 1406B, a mobile computing device 1406C such as a mobile telephone, a smart phone, or other mobile computing device, a server computer 1406D, and/or other devices 14060, such as a wearable computing device. It should be understood that any number of clients 1406 may communicate with the computing environment 1402. An example computing architecture for the clients 1406 are illustrated and described herein with reference to FIG. 13. It should be understood that the illustrated clients 1406 and computing architectures illustrated and described herein are illustrative, and should not be construed as being limited in any way.

In the illustrated configuration, the computing environment 1402 includes application servers 1408, data storage 1410, and one or more network interfaces 1412. According to various implementations, the functionality of the application servers 1408 may be provided by one or more server computers that are executing as part of, or in communication with, the network 1404.

In at least one example, the application servers 1408 may host various services, virtual machines, portals, and/or other resources. In the illustrated configuration, the application servers 1408 may host one or more virtual machines 1414 for executing applications or other functionality. According to various implementations, the virtual machines 1414 may execute one or more applications and/or software modules for detecting leakage of computing resources in a cloud computing architectures. In some cases, the services provided by the application servers 1408 may be related to services provided by a service provider on behalf of a customer.

The application servers 1408 may host or provide access to one or more portals, link pages, Web sites, and/or other information ("Web portals") 1416. The Web portals 1416 may be used to communicate with one or more client computers. The application servers 1408 may include one or more mailbox services 1418. According to various implementations, the application servers 1408 also include one or more mailbox messaging services 1420. The mailbox services 1418 and/or messaging services 1420 may include electronic mail ("email") services, various personal information management ("PIM") services (e.g., calendar services, contact management services, collaboration services, etc.), instant messaging services, chat services, forum services, and/or other communication services.

The application servers 1408 also may include one or more social networking services 1422. The social networking services 1422 may include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1422 are provided by or include the FACEBOOK® social networking service, the LINKEDIN® professional networking service, the MYSPACE® social networking service, the FOURSQUARE® geographic networking service, the YAMMER® office colleague networking service, and the like. In other configurations, the social networking services 1422 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE® service and the XBOX LIVE® service from Microsoft Corporation in Redmond, Wash. Other services are possible and are contemplated.

The social networking services 1422 also may include commenting, blogging, and/or micro blogging services. Examples of such services include, but are not limited to, the YELP® commenting service, the KUDZU® review service, the OFFICETALK® enterprise micro blogging service, the TWITTER® messaging service, the GOOGLE BUZZ® service, and/or other services. It should be appreciated that the above lists of services are not exhaustive and that numerous additional and/or alternative social networking services 1422 are not mentioned herein for the sake of brevity. As such, the above configurations are illustrative, and should not be construed as being limited in any way. According to various implementations, the social networking services 1422 may host one or more applications and/or software modules for providing the functionality described herein for providing contextually-aware location sharing services for computing devices. For instance, any one of the application servers 1408 may communicate or facilitate the functionality and features described herein. For instance, a social networking application, mail client, messaging client, a browser running on a phone or any other client 1406 may communicate with a social networking service 1422.

As shown in FIG. 14, the application servers 1408 also may host other services, applications, portals, and/or other resources ("other resources") 1424. The other resources 1424 may deploy a service-oriented architecture or any other client-server management software. The other resources 1424 may also be related to providing services to customers of a service provider using cloud computing architectures.

As mentioned above, the computing environment 1402 may include the data storage 1410. According to various implementations, the functionality of the data storage 1410 is provided by one or more databases operating on, or in communication with, the network 1404. The functionality of the data storage 1410 also may be provided by one or more server computers configured to host data for the computing environment 1402. The data storage 1410 may include, host, or provide one or more real or virtual containers 1426A-1426N (referred to collectively and/or generically as "containers 1426"). Although not illustrated in FIG. 14, the containers 1426 also may host or store data structures and/or algorithms for execution by one or more modules of remote computing devices (e.g., modules 720, 722, 724, 726, 728 of FIG. 7 and/or the resource leak detection system 128 of FIG. 1 and FIG. 2). Aspects of the containers 1426 may be associated with a database program, file system and/or any program that stores data with secure access features. Aspects of the containers 1426 may also be implemented using products or services, such as ACTIVE DIRECTORY®, DKM®, ONEDRIVE®, DROPBOX® or GOOGLE-DRIVE®.

The computing environment 1402 may communicate with, or be accessed by, the network interfaces 1412. The network interfaces 1412 may include various types of network hardware and software for supporting communications between two or more computing entities including, but not limited to, the clients 1406 and the application servers 1408. It should be appreciated that the network interfaces 1412 also may be utilized to connect to other types of networks and/or computer systems.

It should be understood that the distributed computing environment 1400 described herein may provide any aspects of the software elements described herein with any number of virtual computing resources and/or other distributed computing functionality that may be configured to execute any aspects of the software components described herein. According to various implementations of the concepts and technologies described herein, the distributed computing environment 1400 provides the software functionality described herein as a service to the clients 1406. It should be understood that the clients 1406 may include real or virtual machines including, but not limited to, server computers, web servers, personal computers, tablet computers, gaming consoles, smart televisions, mobile computing entities, smart phones, and/or other devices. As such, various configurations of the concepts and technologies described herein enable any device configured to access the distributed computing environment 1400 to utilize the functionality described herein for detecting leakage of computing resources in cloud computing architectures.

Example Clauses

The disclosure presented herein can be considered in view of the following clauses.

A. A computing device comprising: one or more processors; and one or more computer-readable storage media storing instructions that are executable by the one or more processors to perform operations comprising: obtaining first data indicating a first amount of usage of a computing resource by one or more computing devices over a first period of time; determining reference data based at least partly on the first data, the reference data including at least a distribution of values of the usage of the computing resource over the first period of time; obtaining second data indicating a second amount of usage of the computing resource by the one or more computing devices over a second period of time subsequent to the first period of time; determining that the second amount of usage of the computing resource indicates an increase in usage of the computing resource by the one or more computing devices over the second period of time; determining a value of a computing resource usage metric based at least partly on an amount of the increase in the usage of the computing resource over the second period of time and based at least partly on the reference data; and determining that a computing resource leak is occurring based at least partly on the value of the computing resource usage metric and a duration of the second period of time.

B. The computing device of clause A, wherein the one or more computing devices are included in at least a portion of a cloud computing architecture that hosts one or more instances of a virtual machine.

C. The computing device of clause A or B, wherein the second period of time includes a begin time, an intermediate time, and an end time, and the operations further comprise: determining an additional value of the computing resource usage metric based at least partly on a difference between additional usage of the computing resource at the begin time and at the intermediate time and based at least partly on the reference data; and determining the begin time is a candidate start time for a leak of the computing resource based at least partly on the additional value of the computing resource usage metric being greater than a threshold value.

D. The computing device of any one of clauses A-C, wherein the operations further comprise: obtaining additional data indicating an additional amount of usage of the computing resource by the one or more computing devices over an additional period of time subsequent to the first period of time and preceding the second period of time, the additional period of time including a start time and an end time; and determining that the start time is a candidate start time for a leak of the computing resource.

E. The computing device of clause D, wherein the operations further comprise: determining that the additional amount of usage of the computing resource corresponds to a decrease in usage of the computing resource; determining that the decrease in the usage of the computing resource is greater than a threshold decrease; modifying the candidate start time for the leak of the computing resource from the start time to the end time based at least partly on the decrease in usage of the computing resource being greater than the threshold decrease.

F. The computing device of clause D, wherein the operations further comprise: determining an additional value of the computing resource usage metric based at least partly on the additional amount of usage of the computing resource from the start time to the end time and based at least partly on the reference data; determining that the additional value of the computing resource usage metric is less than a threshold value; and modifying the candidate start time for the leak of the computing resource from the start time to the end time based at least partly on the additional value of the computing resource usage metric being less than the threshold value.

G. The computing device of clause D, wherein the operations further comprise: determining an additional value of the computing resource usage metric based at least partly on the additional amount of usage of the computing resource from the start time to the end time and based at least partly on the reference data; determining that an absolute value of the additional value of the computing resource usage metric is less than a threshold value; determining that the additional period of time is greater than a threshold period of time; and modifying the candidate start time for the leak of the computing resource from the start time to the end time based at least partly on the absolute value of the additional value of the computing resource usage metric being less than the threshold value and the additional period of time being greater than the threshold period of time.

H. The computing device of any one of clauses A-G, wherein the distribution includes a median value, an average value, a standard deviation, a minimum value, a 1% value, a 25% value, a 75% value, a 99% value, a maximum value, or combinations thereof.

I. The computing device of any one of clauses A-H, wherein the computing resource includes volatile memory allocation, non-volatile memory allocation, processor cycles completed, usage of network resources, or combinations thereof.

J. The computing device of any one of clauses A-I, wherein the first period of time is at least 5 days, at least 10 days, at least 20 days, at least 30 days, or at least 40 days.

K. A method comprising: obtaining, by a server computing device including a processor and memory, computing resource usage data indicating an increase in an amount of usage of a computing resource by a group of computing devices of a cloud computing architecture; determining, by the server computing device, a value of a computing resource usage metric based at least partly on the increase in the amount of usage of the computing resource and based at least partly on reference data, the reference data including at least a distribution of the usage of the computing resource over a period of time; determining, by the server computing device, that a computing resource leak is occurring based at least partly on the value of the computing resource usage metric; and determining, by the server computing device, one or more actions to reduce the amount of usage of the computing resource based at least partly on determining that the computing resource leak is occurring.

L. The method of clause K, further comprising: obtaining a plurality of values of usage of the computing resource by a computing device of the group of computing devices by collecting values of usage of the computing resource by the computing device periodically for an additional period of time; and determining a value included in the computing resource usage data based at least partly on the plurality of values.

M. The method of clause L, wherein determining the value included in the computing resource usage data based at least partly on the plurality of values includes determining a maximum value included in the plurality of values, determining an average value of the plurality of values, or determining a median value of the plurality of values.

N. The method of any one of clauses K-M, wherein the additional period of time is at least 5 minutes, at least 10 minutes, at least 20 minutes, at least 30 minute, at least 45 minutes, at least 60 minutes, or at least 75 minutes and the values of the of usage of the computing resource are collected periodically at intervals less than 30 seconds, less than 1 minute, less than 5 minutes, less than 10 minutes, or less than 30 minutes O. The method of any one of clauses K-N, further comprising: obtaining first data indicating usage of the computing resource by a first computing device over a period of time; obtaining second data indicating usage of the computing resource by a second computing device over the period of time; performing a comparison of the first data and the second data; and determining a similarity metric between the first data and the second data based at least partly on the comparison.

P. The method of clause O, further comprising: determining that the first computing device and the second computing device are included in the group of computing devices based at least partly on the similarity metric being above a threshold value.

Q. The method of any one of clauses K-P, further comprising: producing user interface data corresponding to a user interface that indicates the computing resource leak is occurring with respect to a software component being executed by the group of computing devices.

R. The method of any one of clauses K-Q, wherein the software component is one of a plurality of software components included in the user interface, and the user interface indicates the usage of one or more computing resources by the group of computing devices.

S. The method of any one of clauses K-R, further comprising: determining a period of time between a first time that a value of an amount of usage of the computing resource by a computing device of the group of computing devices was obtained and a second time subsequent to the first time; determining that the period of time is greater than a threshold period of time; and removing the value from a data set used to produce the reference data.

T. A computing device comprising: one or more processors; and one or more computer-readable storage media storing instructions that are executable by the one or more processors to perform operations comprising: obtaining computing resource usage data indicating an amount of usage of a computing resource by one or more computing devices over a first period of time; determining reference data based at least partly on the computing resource usage data, the reference data included at least a distribution of values of the amount of usage of the computing resource by the one or more computing devices over the first period of time; collecting a series of values of usage of the computing resource by a computing device of the one or more computing devices over a second period of time that is subsequent to the first period of time; determining a value of a computing resource usage metric based at least partly on an amount of increase in the usage of the computing resource by the computing device over a second period of time and based at least partly on the reference data; determining a duration of the second period of time; determining a number of values included in the series that increased with respect to a previous value in the series; and determining a computing resource leak detection score based at least partly on the value of the computing resource usage metric, the duration of the second period of time, and the number of values included in the series that increased with respect to the previous value in the series.

U. The computing device of clause T, wherein the value of the computing resource usage metric is associated with a first weight, the duration of the second period of time is associated with a second weight, and the number of values included in the series that increased with respect to the previous value in the series is associated with a third weight; and determining the computing resource leak detection score is further based at least partly on the first weight, the second weight, and the third weight.

V. The computing device of clause T or U, wherein determining the computing resource leak detection score includes: determining that the value of the computing resource usage metric is greater than a first threshold; determining that the duration of the second period of time is greater than a second threshold; and determining that the number of values included in the series that increased with respect to the previous value in the series is greater than a third threshold.

W. The computing device of any one of clauses T-V, wherein the operations further comprise: updating the reference data based at least partly on the series of values of usage of the computing resource by a computing device of the one or more computing devices collected over the second period of time.

X. The computing device of any one of clauses T-W, wherein the operations further comprise: determining a probability that a leak of the computing resource is occurring with respect to the computing device based at least partly on the computing resource leak detection score; and determining one or more actions to reduce the usage of the computing resource by the computing device based at least partly on the resource leak detection score being above a threshold score.

Y. The computing device of any one of clauses T-X, wherein the one or more computing devices are included in a group of computing devices hosting one or more instances of a virtual machine, and the operations further comprise: generating user interface data corresponding to a user interface that includes an indication of a number of computing devices included in the group of computing devices that are associated with a leak of the computing resource.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. A method comprising:
   obtaining, by a server computing device including a processor and memory, computing first data indicating a first amount of usage of a computing resource by one or more computing devices over a first period of time;
   determining, by the server computing device, reference data based at least partly on the first data, the reference data including at least a distribution of values of the usage of the computing resource over the first period of time;
   obtaining, by the server computing device, second data indicating a second amount of usage of the computing resource by the one or more computing devices over a second period of time subsequent to the first period of time;
   determining, by the server computing device, that the second amount of usage of the computing resource indicates an increase in usage of the computing resource by the one or more computing devices over the second period of time;
   determining, by the server computing device, a value of a computing resource usage metric based at least partly on an amount of the increase in the usage of the computing resource over the second period of time and based at least partly on the reference data; and
   determining, by the server computing device, that a computing resource leak is occurring based at least partly on the value of the computing resource usage metric and a duration of the second period of time.

2. The method of claim 1, wherein the one or more computing devices are included in at least a portion of a cloud computing architecture that hosts one or more instances of a virtual machine.

3. The method of claim 1, wherein the second period of time includes a begin time, an intermediate time, and an end time, and the method further comprising:
   determining an additional value of the computing resource usage metric based at least partly on a difference between additional usage of the computing resource at the begin time and at the intermediate time and based at least partly on the reference data; and
   determining the begin time is a candidate start time for a leak of the computing resource based at least partly on the additional value of the computing resource usage metric being greater than a threshold value.

4. The method of claim 1, wherein the method further comprises:
   obtaining additional data indicating an additional amount of usage of the computing resource by the one or more computing devices over an additional period of time subsequent to the first period of time and preceding the second period of time, the additional period of time including a start time and an end time; and
   determining that the start time is a candidate start time for a leak of the computing resource.

5. The method of claim 4, wherein the method further comprises:
   determining that the additional amount of usage of the computing resource corresponds to a decrease in usage of the computing resource;
   determining that the decrease in the usage of the computing resource is greater than a threshold decrease;
   modifying the candidate start time for the leak of the computing resource from the start time to the end time based at least partly on the decrease in usage of the computing resource being greater than the threshold decrease.

6. The method of claim 4, wherein the method further comprises:
   determining an additional value of the computing resource usage metric based at least partly on the additional amount of usage of the computing resource from the start time to the end time and based at least partly on the reference data;
   determining that the additional value of the computing resource usage metric is less than a threshold value; and
   modifying the candidate start time for the leak of the computing resource from the start time to the end time based at least partly on the additional value of the computing resource usage metric being less than the threshold value.

7. The method of claim 4, wherein the method further comprises:
   determining an additional value of the computing resource usage metric based at least partly on the additional amount of usage of the computing resource from the start time to the end time and based at least partly on the reference data;

determining that an absolute value of the additional value of the computing resource usage metric is less than a threshold value;
determining that the additional period of time is greater than a threshold period of time; and
modifying the candidate start time for the leak of the computing resource from the start time to the end time based at least partly on the absolute value of the additional value of the computing resource usage metric being less than the threshold value and the additional period of time being greater than the threshold period of time.

8. A computing system comprising
One or more processors; and
One or more storage devices storing computer-executable instructions that are operable, when executed by the one or more processors, to configure the computing system to perform the following:
obtain computing resource usage data indicating an increase in an amount of usage of a computing resource by a group of computing devices of a cloud computing architecture;
determine a value of a computing resource usage metric based at least partly on the increase in the amount of usage of the computing resource and based at least partly on reference data, the reference data including at least a distribution of the usage of the computing resource over a period of time;
determine that a computing resource leak is occurring based at least partly on the value of the computing resource usage metric; and
determine one or more actions to reduce the amount of usage of the computing resource based at least partly on determining that the computing resource leak is occurring.

9. The computing system of claim 8, the computer-executable instructions being further operable, when executed by the one or more processors, to configure the computing system to:
obtain a plurality of values of usage of the computing resource by a computing device of the group of computing devices by collecting values of usage of the computing resource by the computing device periodically for an additional period of time; and
determine a value included in the computing resource usage data based at least partly on the plurality of values.

10. The computing system of claim 9, wherein determining the value included in the computing resource usage data based at least partly on the plurality of values includes determining a maximum value included in the plurality of values, determining an average value of the plurality of values, or determining a median value of the plurality of values.

11. The computing system of claim 8, the computer-executable instructions being further operable, when executed by the one or more processors, to configure the computing system to:
obtain first data indicating usage of the computing resource by a first computing device over a period of time;
obtain second data indicating usage of the computing resource by a second computing device over the period of time;
perform a comparison of the first data and the second data; and
determine a similarity metric between the first data and the second data based at least partly on the comparison.

12. The computing system of claim 11, the computer-executable instructions being further operable, when executed by the one or more processors, to configure the computing system to:
determine that the first computing device and the second computing device are included in the group of computing devices based at least partly on the similarity metric being above a threshold value.

13. The computing system of claim 8, the computer-executable instructions being further operable, when executed by the one or more processors, to configure the computing system to:
produce user interface data corresponding to a user interface that indicates the computing resource leak is occurring with respect to a software component being executed by the group of computing devices.

14. The computing system of claim 8, the computer-executable instructions being further operable, when executed by the one or more processors, to configure the computing system to:
determine a period of time between a first time that a value of an amount of usage of the computing resource by a computing device of the group of computing devices was obtained and a second time subsequent to the first time;
determine that the period of time is greater than a threshold period of time; and
remove the value from a dataset used to produce the reference data.

15. A method implemented by a computing system that includes at least one processor and one or more hardware storage devices storing computer-executable instructions that are executable by the at least one processor for configuring the computing system to implement the method, the method comprising the computing system:
identifying computing resource usage data indicating an increase in an amount of usage of a computing resource by a group of computing devices of a cloud computing architecture;
determining a value of a computing resource usage metric based at least partly on the increase in the amount of usage of the computing resource and based at least partly on reference data, the reference data including at least a distribution of the usage of the computing resource over a period of time;
detecting a computing resource leak that is occurring based at least partly on the value of the computing resource usage metric; and
presenting a graphical representation of the computing resource leak on a computing interface in such a manner as to visually distinguish one or more software components that are determined to be associated with the computing resource leak from one or more software components that are determined to not be associated with the computing resource leak.

16. The method of claim 15, wherein the method further includes:
determining one or more actions to reduce the amount of usage of the computing resource based at least partly on determining that the computing resource leak is occurring.

17. The method of claim 15, wherein the presenting of the graphical representation includes presenting a pie chart that includes shading that visually indicates a probability of the computing resource leak occurring with respect to a particular grouping of computing devices within the cloud computing architecture.

18. The method of claim 15, wherein the presenting of the graphical representation includes presenting a pie chart that includes shading that visually indicates a percentage of computing resources within the cloud computing architecture that are determined to be associated with the computing resource leak.

19. The method of claim 15, wherein the presenting of the graphical representation includes presenting a bar chart that includes shading that visually indicates a probability of the computing resource leak occurring with respect to a particular grouping of computing devices within the cloud computing architecture.

20. The method of claim 15, wherein the method further includes presenting a subsequent interface that identifies information about the one or more software components that are determined to be associated with the computing resource leak in response to detecting user input directed at the graphical representation.

* * * * *